(12) United States Patent
O'Neill

(10) Patent No.: US 11,550,454 B2
(45) Date of Patent: Jan. 10, 2023

(54) METHODS AND SOFTWARE FOR CREATING WORKFLOWS

(71) Applicant: Cotham Technologies Limited, Bristol (GB)

(72) Inventor: Dominic Desmond Phelim O'Neill, Bristol (GB)

(73) Assignee: Cotham Technologies Limited, Bristol (GB)

(*) Notice: Subject to any disclaimer, the term of this patent is extended or adjusted under 35 U.S.C. 154(b) by 186 days.

(21) Appl. No.: 15/023,771

(22) PCT Filed: Sep. 24, 2014

(86) PCT No.: PCT/GB2014/052904
§ 371 (c)(1),
(2) Date: Mar. 22, 2016

(87) PCT Pub. No.: WO2015/044662
PCT Pub. Date: Apr. 2, 2015

(65) Prior Publication Data
US 2016/0232013 A1    Aug. 11, 2016

(30) Foreign Application Priority Data

Sep. 24, 2013    (GB) ...................................... 1316948

(51) Int. Cl.
*G06F 3/04842* (2022.01)
*G06F 8/34* (2018.01)
(Continued)

(52) U.S. Cl.
CPC ........ *G06F 3/04842* (2013.01); *G06F 3/0482* (2013.01); *G06F 3/04886* (2013.01);
(Continued)

(58) Field of Classification Search
CPC ...... G06F 8/34; G06F 3/048; G06F 9/46–548; G06F 9/45; G06F 3/04886; G06F 3/0482;
(Continued)

(56) References Cited

U.S. PATENT DOCUMENTS 5,608,898 A * 3/1997 Turpin .................. G06F 40/174
6,823,495 B1 * 11/2004 Vedula ...................... G06F 8/34
715/763
(Continued)

OTHER PUBLICATIONS

Alexander Rebane. "Reaktor 5: Getting Started Guide". Jun. 2010. https://www.native-instruments.com/fileadmin/ni_media/downloads/manuals/Reaktor_5_Getting_Started_English.pdf (Year: 2010).*
(Continued)

*Primary Examiner* — Liang Y Li
(74) *Attorney, Agent, or Firm* — McDonnell Boehnen Hulbert & Berghoff LLP

(57) ABSTRACT

A method of creating a workflow on a smart device, comprising: presenting to a user for selection a plurality of input devices, each representing a data input mechanism of said smart device; receiving from the user a selection of one or more of said input devices; presenting to the user for selection a plurality of action devices, each representing a possible action to be taken by the smart device; receiving from the user a selection of one or more of said action devices; wherein each input device has one or more input device outputs, and wherein each action device has one or more action device inputs, and wherein the method further comprises forming one or more input-action associations each comprising a selected input device output associated with a selected action device input. The software provides a new system and method for operating a computer, allowing the user to create workflows linking several different inputs and actions, while avoiding or reducing the need to switch between different applications and different contexts. This
(Continued)

results in significant improvements in efficiency and reliability during operation and allows specific workflows to be generated without the need for a skilled programmer. Combinations and sequences of input-action associations can also be generated for enhanced workflow creation.

24 Claims, 17 Drawing Sheets

(51) Int. Cl.
    *G06Q 10/00*     (2012.01)
    *G06F 3/04886*     (2022.01)
    *G06F 9/451*     (2018.01)
    *G06F 16/00*     (2019.01)
    *G06F 3/0482*     (2013.01)

(52) U.S. Cl.
    CPC ............... *G06F 8/34* (2013.01); *G06F 9/451* (2018.02); *G06F 16/00* (2019.01); *G06Q 10/00* (2013.01)

(58) Field of Classification Search
    CPC ......... G06F 3/04842; G06F 9/451–454; Y10S 715/967; H04M 1/72522–72561; G06Q 10/10
    See application file for complete search history.

(56) References Cited

U.S. PATENT DOCUMENTS

| | | | | | |
|---|---|---|---|---|---|
| 8,239,840 | B1* | 8/2012 | Czymontek | ............... | G06F 8/34 717/125 |
| 8,515,920 | B2* | 8/2013 | Peyton | ............... | G06F 8/34 707/687 |
| 2001/0044738 | A1* | 11/2001 | Elkin | ............... | G06Q 10/06316 705/7.26 |
| 2006/0074735 | A1* | 4/2006 | Shukla | ............... | G06F 8/34 705/80 |
| 2006/0161869 | A1* | 7/2006 | Robertson | ............... | G06F 16/84 715/853 |
| 2007/0044030 | A1* | 2/2007 | Hayles | ............... | G06F 8/34 715/762 |
| 2009/0113329 | A1* | 4/2009 | Corona | ............... | G06F 3/0486 715/769 |
| 2010/0218134 | A1* | 8/2010 | B'Far | ............... | G06F 8/34 715/780 |
| 2011/0184870 | A1* | 7/2011 | Angel | ............... | G06F 8/34 707/E17.049 |
| 2011/0289515 | A1 | 11/2011 | Hung et al. | | |
| 2011/0320504 | A1* | 12/2011 | Marin | ............... | G06F 9/542 707/805 |
| 2012/0084695 | A1* | 4/2012 | Higgins | ............... | G06F 8/34 715/771 |
| 2014/0089825 | A1* | 3/2014 | Lee | ............... | G06F 3/048 715/762 |
| 2014/0282402 | A1* | 9/2014 | Eksten | ............... | G06F 9/5072 717/123 |

OTHER PUBLICATIONS

Duckworth, Andy. Yahoo! Pipes. Jun. 17, 2008. Youtube. https://www.youtube.com/watch?v=1GnZZT-gNi8&list=PL26C36161491F8FA9&index=8 (Year: 2008).*

Yahoo Pipes Homescreen. Yahoo. Sep. 22, 2012. https://web.archive.org/web/20120922234633/http://pipes.yahoo.com/pipes/pipes.popular (Year: 2012).*

International Search Report dated Jan. 8, 2015 for PCT/GB2014/052904 filed Sep. 24, 2014.

European Patent Office, Summons to Attend Oral Proceedings dated Jul. 16, 2020, issued in connection with European Patent Application No. 14777124.0, 10 pages.

European Search Report dated Oct. 18, 2021 for European Application No. 21182596.3, 17 pages.

\* cited by examiner

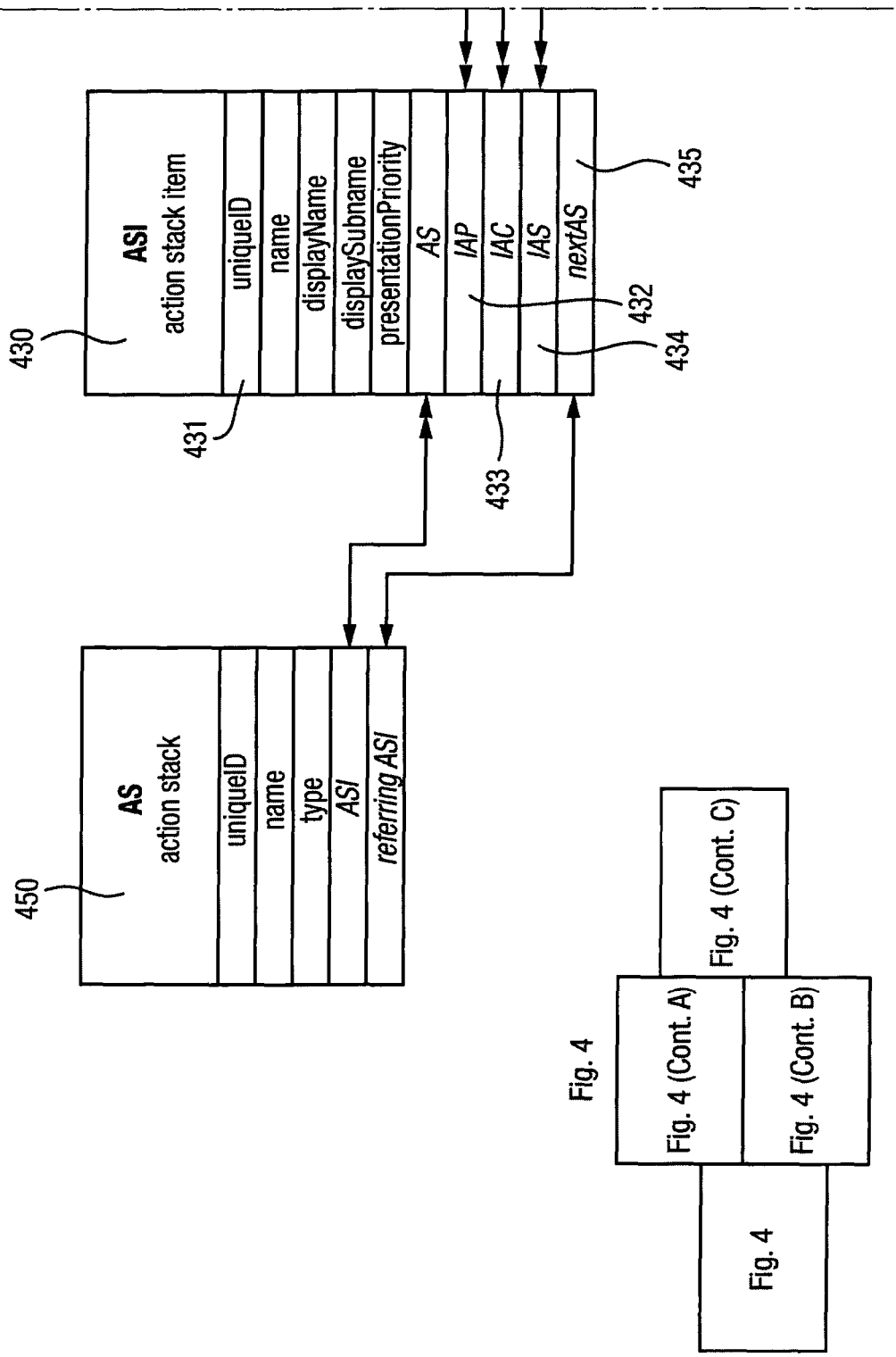

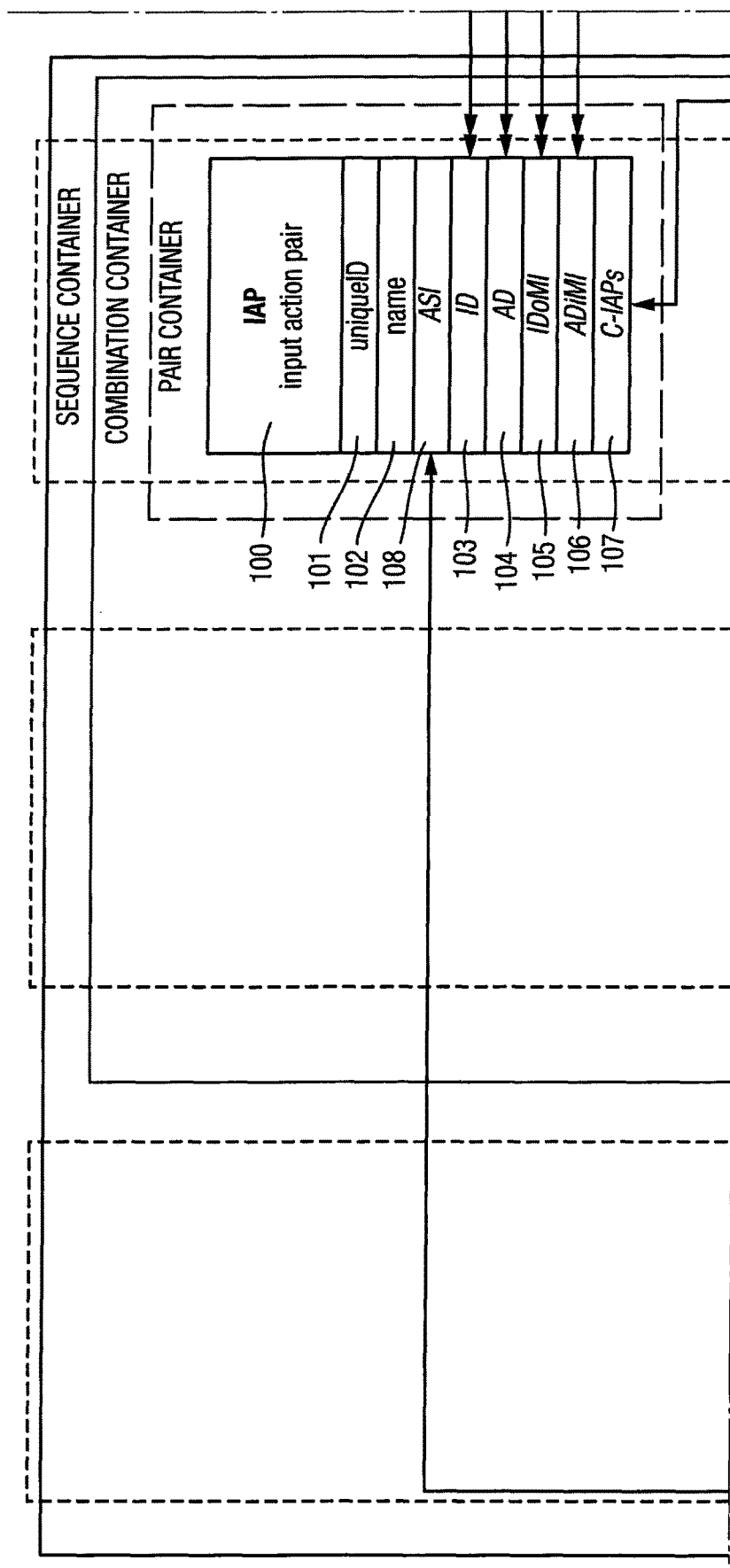
Fig. 4 (Cont. A)

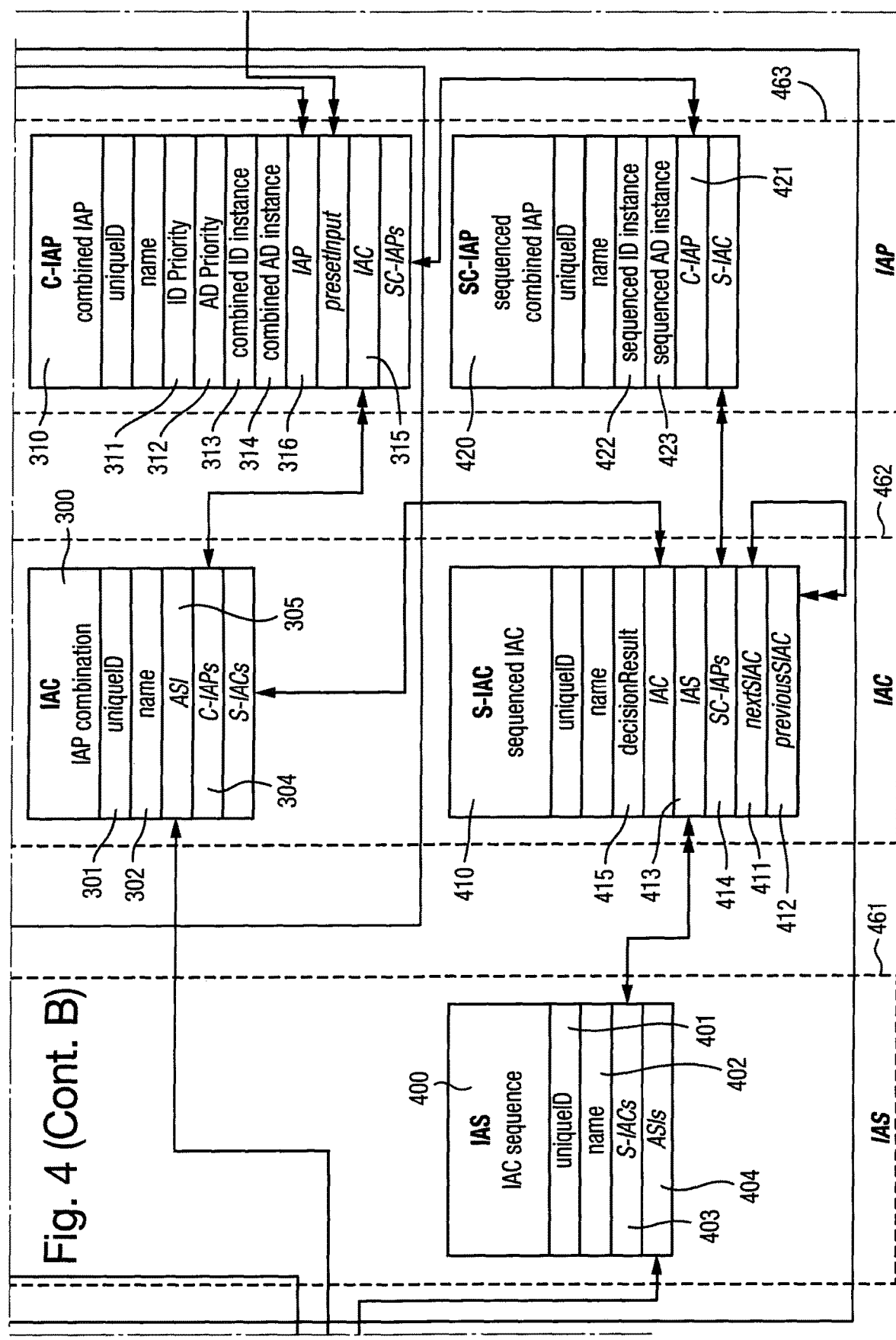

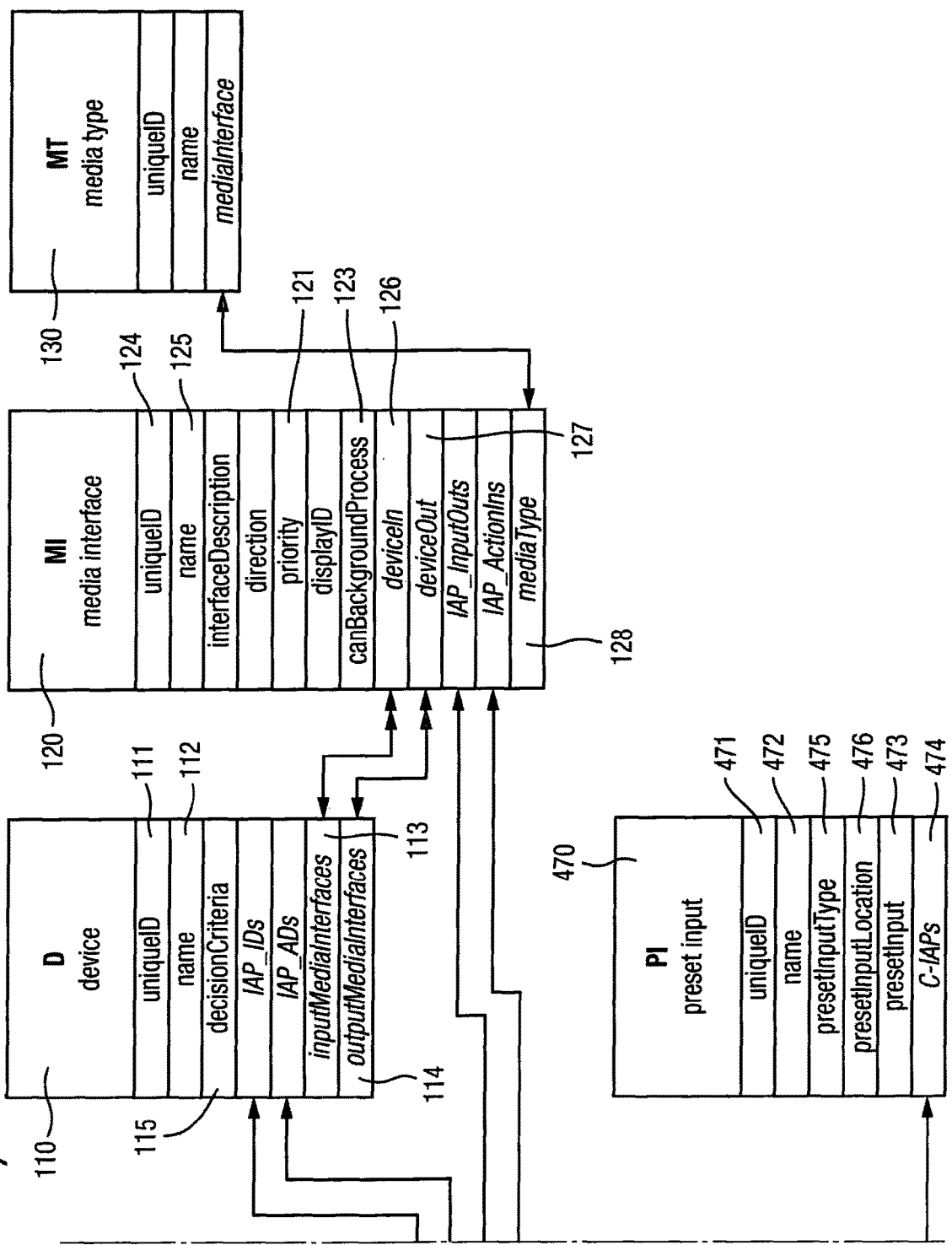
Fig. 4 (Cont. C)

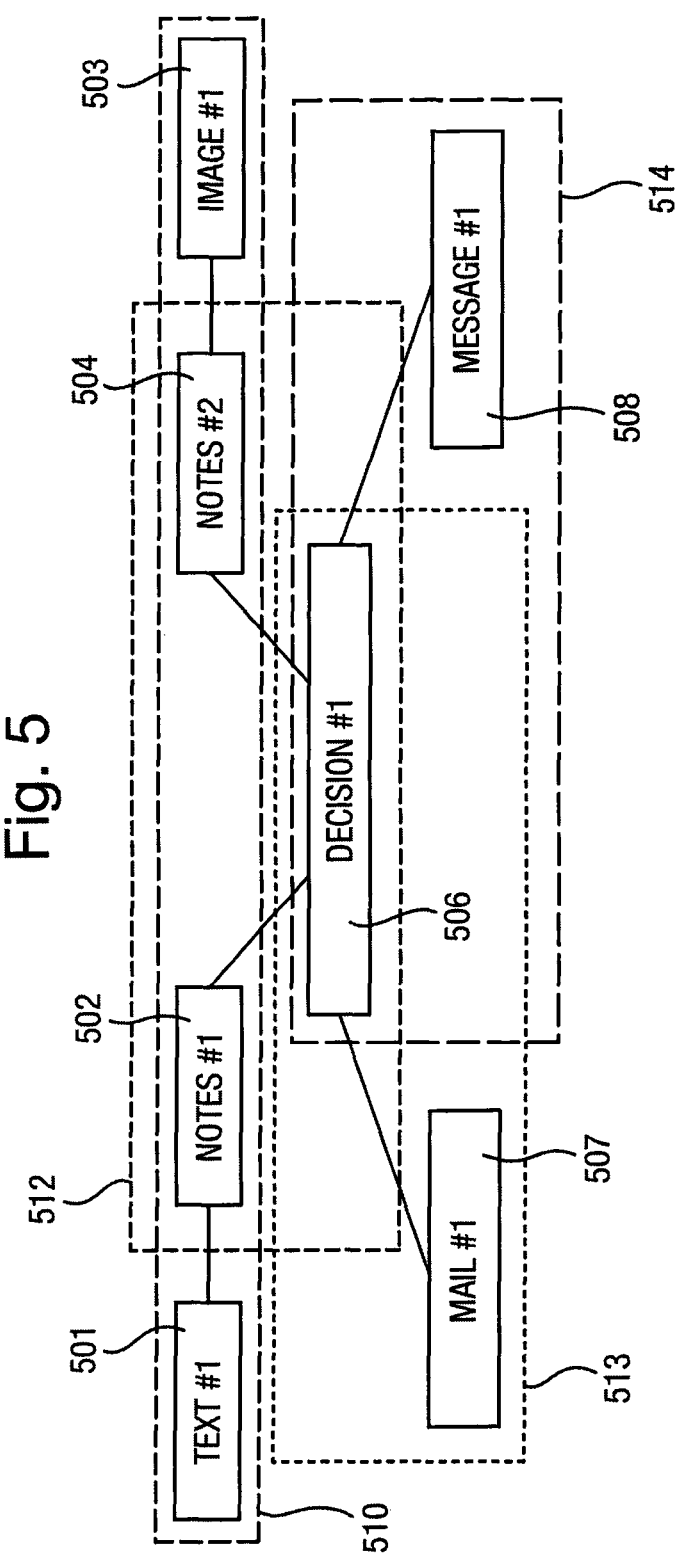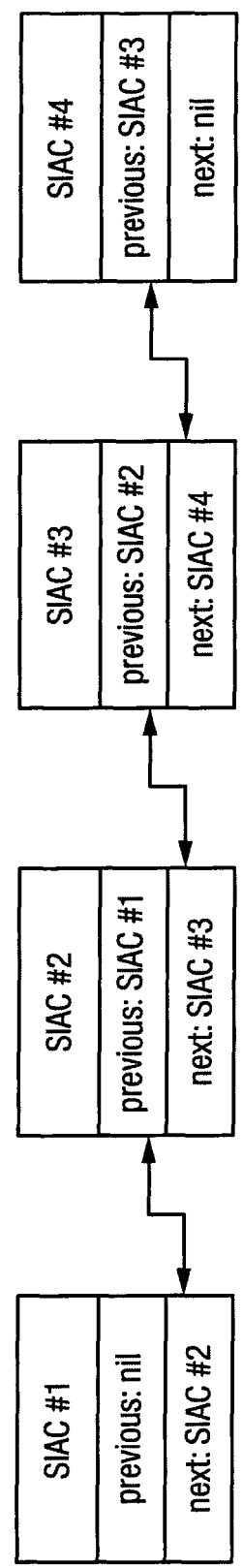

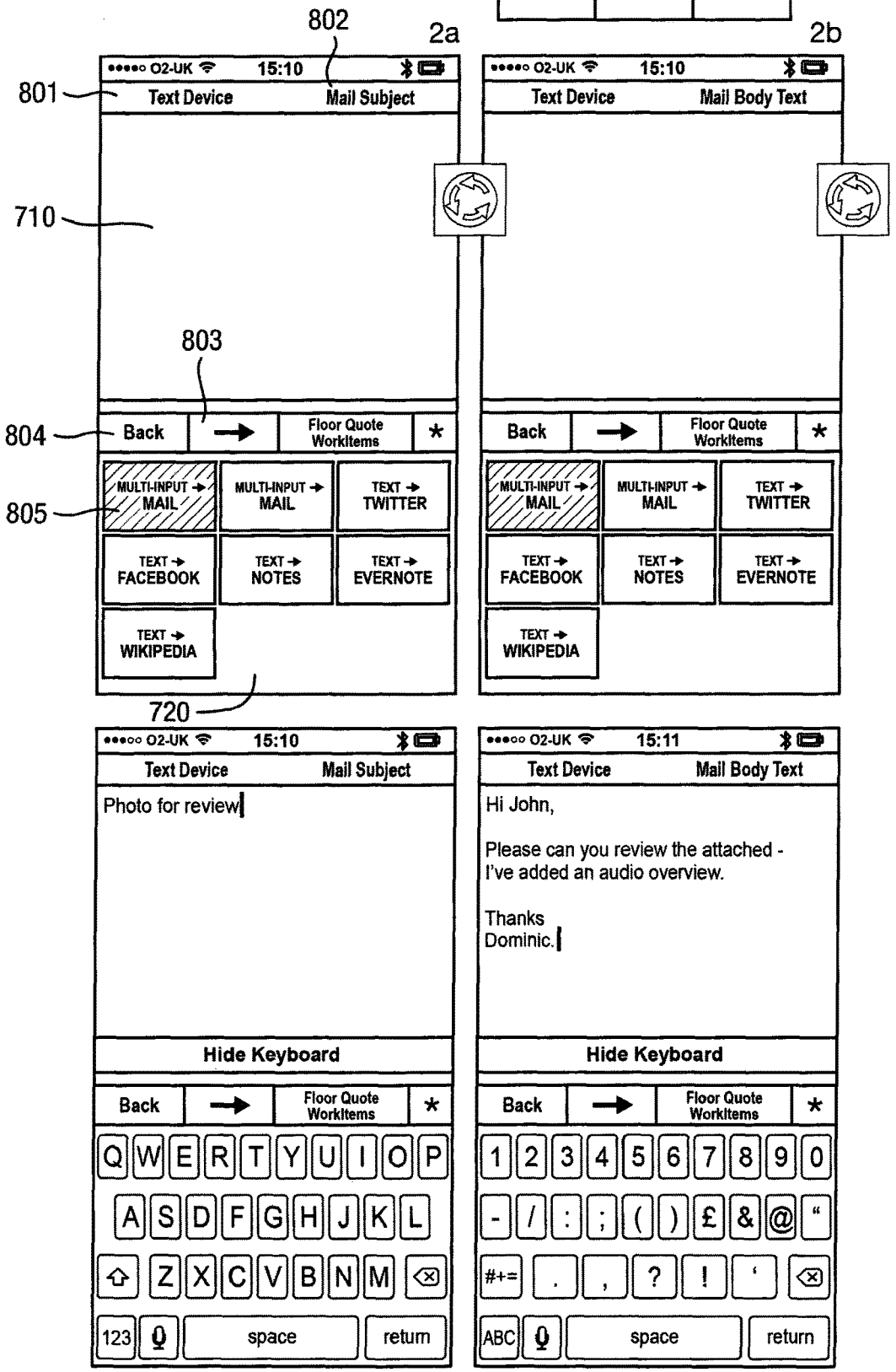

Fig. 8 (Cont. A)
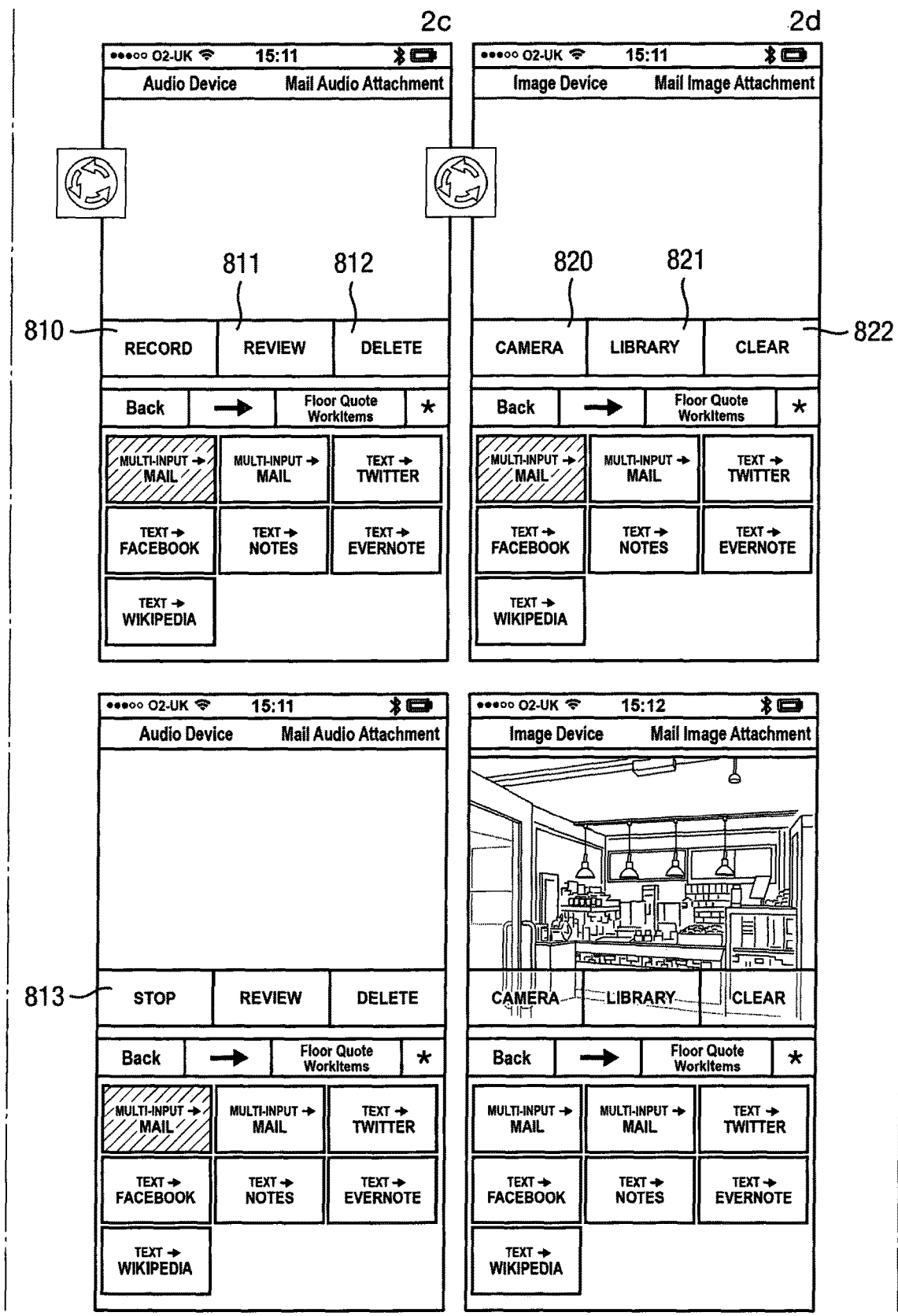

Fig. 8 (Cont. B)
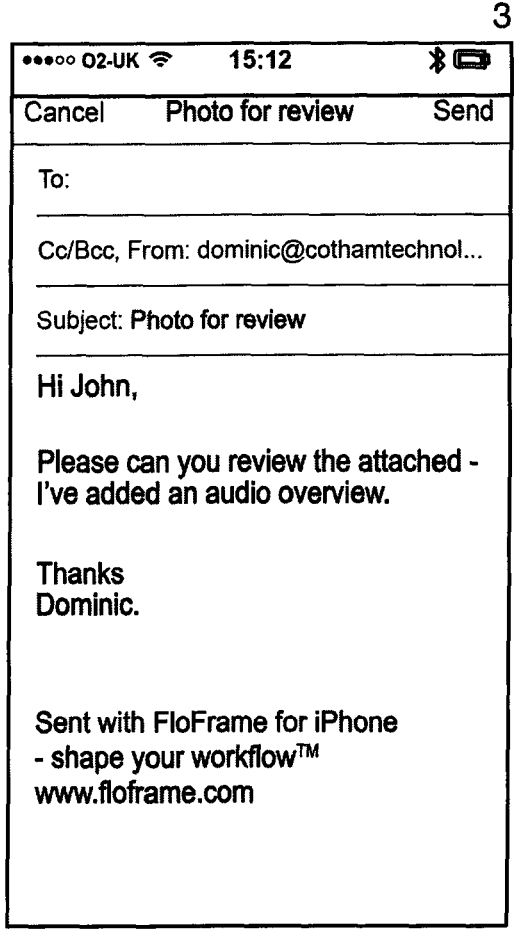

Fig. 9-2
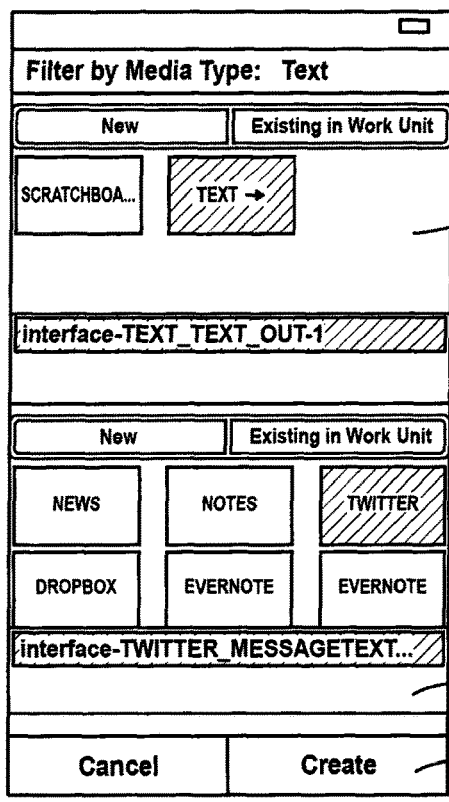
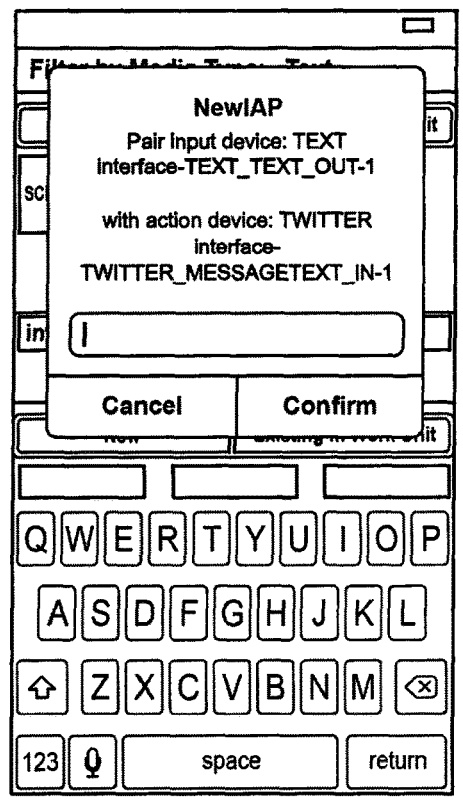
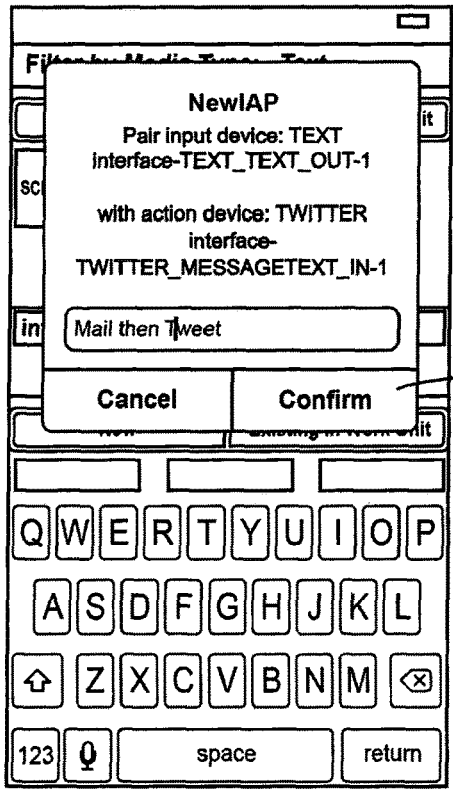
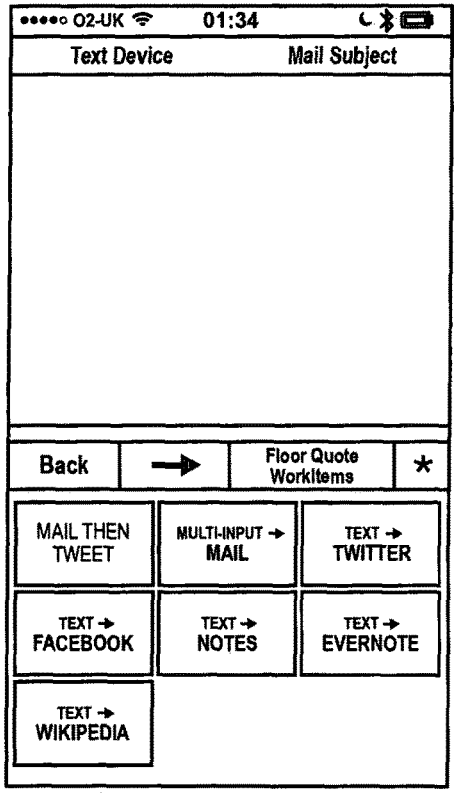

METHODS AND SOFTWARE FOR CREATING WORKFLOWS

The invention relates to methods and software for facilitating access to various interfaces and data sources on a smart device and for creating links between inputs and outputs and building workflows.

The current software model for programming smart devices and making functionality available to end users is for developers to write applications ("apps") and then to release those applications for download (free of charge or for a price), often via a software portal such as an online store.

Smart devices such as mobile phones, personal digital assistants, tablet computers and notebook and desktop computers have increasing functionality built into them. For example, these devices will often now have a touchscreen for input of text or for making other selections, a microphone for recording audio content, a camera for taking still photographs or capturing video footage, aerials (antennas) and location processors for detecting and calculating the current location of the device (e.g. via GPS or assisted GPS or via other radio-based trilateration techniques), magnetic sensors for direction and orientation sensing and accelerometers for detecting movement. Magnetic sensors and accelerometers are often present in multiple orientations, e.g. three of each type of sensor to cover the three dimensions of space and thus detect all possible direction and movement information.

The programmability of smart devices and their connection to the internet via Wi-Fi (e.g. 802.11 or WiMAX or similar) or via cellular data networks also enables a virtually limitless variety of outputs to which the various input data of the smart device can be sent. However the mechanism by which inputs are linked to outputs (with possible intermediate processing) is not readily accessible to the end user in that most end users do not have the necessary programming skills to write an application to achieve their desired goal. Moreover, in many cases a particular linking of inputs and outputs will only be of interest to a small group of users or even a single individual. In such cases the cost of engaging a programmer to write the required code may be prohibitively expensive or time consuming and the desired software is not created.

In some cases (but not all), the desired functionality may be available by combining several existing applications. For example one commercially available app may perform the first step of the required processing, while a second commercially available app can perform the second step of the required processing. Providing the user can export (e.g. save or copy) the results of the first app and subsequently import (e.g. load or paste) the results into the second app, the desired functionality can be achieved, but not efficiently. Exporting and re-importing is inefficient in terms of time. The use of two separate programs is inefficient in terms of device resources (e.g. memory). Additionally, the user may well have to pay for the two separate apps, so it can also be inefficient in financial terms. The need to use (and switch between) multiple different applications means that a large number of key presses (e.g. touchscreen taps, button presses, mouse clicks, keyboard keystrokes or similar inputs) are required to complete a task, including the key presses required to switch between the different apps and to execute copy and paste functions. Additionally, the user is forced to switch context several times as he or she switches between apps. Different apps can present their functionality to the user in quite different ways (different menus, different layouts, different orientations, different colour schemes, etc.). This requires a lot of concentration from the user and mistakes can easily be made, leading to errors in executing the task, or at least further key presses to correct the errors.

Some applications allow certain interaction with other programs. For example some applications will allow the user to export results via SMS message or via email. Some applications will allow export directly into another specific program. However these functionalities are built into the application for a specific output and do not allow creation of new workflows or make use of the full functionality available in the device.

According to the invention there is provided a method of creating a workflow on a smart device, comprising: presenting to a user for selection a plurality of input devices, each representing a data input mechanism of said smart device; receiving from the user a selection of one or more of said input devices; presenting to the user for selection a plurality of action devices, each representing a possible action to be taken by the smart device; receiving from the user a selection of one or more of said action devices; wherein each input device has one or more input device outputs, and wherein each action device has one or more action device inputs, and wherein the method further comprises forming one or more input-action associations each comprising a selected input device output associated with a selected action device input.

Each input action association may be considered a pairing between an input device output and an action device input, thus forming an input action pair. However it will be appreciated that other objects could also be associated with the pair. Thus, although the term "pair" is used frequently throughout this document, it will be understood that this is not intended to limit the invention to an association of only two objects.

By such methods, the user is provided with the possibility to use the various smart device inputs with far greater freedom than under the current "app-centric" model, without needing to have programming skills. The user may be presented with a list of available inputs covering all or a large portion of the device's capabilities in terms of inputs. The user may also be presented with a list of the available actions that can be taken on those inputs and the user is free to create combinations of those inputs and actions, i.e. the user can create customized or personalized links between the device inputs and the available actions to accomplish particular tasks. The presentation to the user will most likely be via a device interface such as a visual display screen and user selection may take place via device interfaces such as a touchscreen (although it will be appreciated that other forms of output interface such as audio description or printing and other forms of input interface such as by audio input, keyboard or pointer device input, etc. could equally well be used).

It will be appreciated that the term smart device is used here to mean any computer, whether handheld, wearable, laptop or desktop that includes a plurality of input means that can be channeled into different processing devices. However, in some preferred embodiments the smart device is a portable computer such as a mobile telephone, personal digital assistant, tablet computer, wearable computer (e.g. watch or glasses) or laptop computer, most preferably the first four of these.

The system adapts well to constrained form factors, such as wearable devices (watches, glasses, etc.) where the physical area of user interface can be quite limited, as the mechanisms provided by the system enable a large number of complex functions to be created on-the-fly from few building blocks.

Thus in a UI-constrained environment only the few building blocks need to be presented (e.g. displayed) and the user is able to realise the more complex working via use of an inputted signal (e.g. gestures, small joystick switches, voice command or other input controls) that combine the building blocks according to the mechanisms that form part of the invention.

In some preferred embodiments the user selects an input device output and an action device input to form at least one input-action association. In other preferred embodiments the relevant inputs and outputs may be identified automatically by the software based on context.

Preferably the input device outputs and the action device inputs have associated therewith a media type which identifies the type of content that will be produced on that output or that is required to be delivered to that input respectively. In other embodiments, media types may be handled less strictly and conversion between one type and another may be conducted on the fly at execution time.

In some preferred embodiments the method automatically identifies an input device output and an action device input that can be paired (associated) by matching their respective media types. In some situations there may be multiple possible matches between the inputs and actions. For example, a Text input device could be matched to either the body text or subject text input of a Mail action device (both having the same media type of "Text"). In such scenarios the method may present to the user a reduced set of media inputs or outputs that match types, thus facilitating the selection process. In the aforementioned example, by matching media types the user could be presented with only two input options (body text or subject text) rather than also presenting incompatible inputs such as image/audio attachment inputs or contact inputs.

A workflow or task may involve only a single input action association, but more complex tasks will invariably involve many such associations. Therefore preferably a plurality of input-action pair associations are formed and the method further comprises associating a plurality of input-action associations together to form an input-action combination. This combination acts to group together related input action associations into a single work unit that accomplishes a particular task. Such combinations may involve one or more input devices and one or more action devices as will be described later. An input action combination will typically be used to group together input action associations that are to be executed together as a single unit.

The order of input action associations within a combination may be undefined, thus allowing the software implementation to select or optimise the order in which any input mechanisms are presented to the user or to select or optimise the order in which entered data is transferred to the action devices for further processing. However, in many situations the nature of a task will lend itself to a certain order of inputs or a certain order of processing. Preferably therefore the method further comprises allocating an input device priority attribute to one or more input-action associations within the input-action combination, said input device priority attribute identifying a preferred order in which input devices should be presented to the user for input data collection. Likewise, preferably the method further comprises allocating an action device priority attribute to one or more input-action associations within the input-action combination, said action device priority attribute identifying a preferred order in which action devices should be processed.

The priority attribute may be determined by logic or context, but in some embodiments it is preferably entered or provided by the user. For example, once the input action associations for an input action combination have been created, the user may apply input and/or action priorities to one or more of the input action associations. It should be noted that priorities can be allocated to all of the pairs (associations) or to a subset of them. Pairs (associations) without allocated priorities may be presented and/or executed by the software in any order so long as they do not conflict with any allocated priorities.

Preferably the input-action combination has an input device instance attribute associated with each input-action association within the input-action combination, said input device instance attribute identifying an instance of the input device to which the input-action association relates.

Preferably the input-action combination has an action device instance attribute associated with each input-action association within the input-action combination, said action device instance attribute identifying an instance of the action device to which the input-action association relates.

Although input action associations (pairs) may operate completely separately, it is also possible, and highly beneficial for the results of one action to be used as inputs to further actions. This enables more complex workflows to be defined. However, in certain situations some tasks must be fulfilled before others can be executed. Therefore in some preferred embodiments a plurality of input-action associations are formed and the method further comprises allocating a dependency attribute to at least one input action association which identifies another input-action association on which it depends. By identifying the dependencies, the software can ensure that correct processing of the input action associations takes place, with the dependencies being fulfilled before executing those that depend upon them. In some scenarios dependencies may be identifiable by the software without explicit hard coded links (i.e. without using a dependency attribute). However, in other situations the dependency attribute will be required.

Dependencies allow partial sequencing to occur within a set of tasks, i.e. they allow a subset of tasks within a workflow to be given a defined order while other tasks within the workflow may have no defined order relationship and can thus be carried out at any stage in the workflow. However, in many cases, full sequencing is desired, with every step having a defined position within the sequence and the steps being executed in turn. Accordingly, it is preferred that a plurality of input-action combinations are formed and the method further comprises forming a sequence of a plurality of input-action combinations to form an input-action sequence. It is further preferred that the method further comprises allocating a sequence position attribute to each input action combination in the input action sequence identifying its position within the sequence. In some embodiments the sequence position attribute may be in the form of a sequence number which identifies a position within the sequence. In other embodiments, the sequence position attribute may be in the form of an identifier of the next and/or previous input action combination in the sequence. Full sequencing of tasks allows familiar workflow patterns to be developed, with set tasks always being carried out in the same order, thus minimising errors or omissions.

Preferably each input-action association in an input-action sequence has a sequenced input device instance attribute that identifies an instance of the input device to which the input-action association relates.

Preferably each input-action association in an input-action sequence has a sequenced action device instance attribute that identifies an instance of the action device to which the input-action association relates.

As mentioned earlier, one major benefit of the system described here is that tasks and workflows can be defined which re-use inputs for multiple purposes or which combine various inputs into a single location or process. Therefore in some preferred embodiments the method comprises forming a first input action association between a first input device and a first action device and forming a second input action association between said first input device and a second action device. This allows the same input to be used for multiple outputs.

In other preferred embodiments the method comprises forming a first input action association between a first input device and a first action device and forming a second input action association between a second input device and said first action device. This allows multiple input devices to feed into the same action device for collecting inputs.

In yet other preferred embodiments the method comprises forming a first input action association between a first output of a first input device and an input of a first action device and forming a second input action association between said first output of said first input device and an input of a second action device. Where an input device has several outputs, it is possible for the same output of a single input device to be connected in parallel to more than one action device, thus utilising the same data source for multiple actions or tasks.

In still other preferred embodiments the method comprises forming a first input action association between an output of a first input device and a first input of a first action device and forming a second input action association between an output of a second input device and said first input of said first action device. Where an action device has several inputs, it is still possible for the same input of a single action device to be connected in parallel to more than one input device, thus receiving from multiple data sources on the same input.

A large number of different inputs devices and action devices are possible with the preferred embodiments of the invention. However, it is preferred that at least one input device is selected from among: a text capture device, an image capture device, a video capture device, an audio capture device, a touch capture device, a speech capture device, a location sensing device, an orientation sensing device, an acceleration sensing device, a monitoring device, a notification driven device, an event driven device, a time based device and a connectivity sensing device. Other contextual sensing devices may also be provided. Input devices may perform some additional internal processing on the input possibly involving further input from the user. It will be appreciated that the input devices from this list may be included singly or in any combination.

It is likewise preferred that at least one action device is selected from among: an email sending device, a short messaging device, a media messaging device, a social networking device, a blogging device, a notes device, a local storage device, a cloud storage device, an information reference device, a telecommunication device, a news reading device, a book reading device, a database device, a web browsing device, a web application device, an internet client application device, a mobile app launching device, a text processing device, an audio processing device, an image processing device, a vector drawing processing device, a numeric processing device, a touch processing device, a video processing device, a navigation device, a healthcare device, a payment device, a retail commerce device, a general processing device, a games device, a monitoring device, a notification device, an event generation device and a media streaming device.

Other utility devices, adjunct devices (providing a function adjunct to and in support of a user's primary activity) or contextual information (location, orientation, acceleration etc.) processing devices may be provided. Again, it will be appreciated that the action devices from this list may be included singly or in any combination.

An information reference device may be a dictionary, encyclopedia, or other information repository.

The method preferably further comprises storing the details of the input-action associations, the input-action combinations and the input-action sequences as database entries in a database. This preferably includes storing attributes associated with each association (pair), combination or sequence alongside those objects. Preferably the storing also includes storing relationships between the various objects together with those objects. Preferably the storing also includes storing attributes associated with the various objects together with those objects.

According to a further aspect, the invention provides a smart device comprising a database, said database comprising: a data structure for storing details of various input devices that represent data input mechanisms of the smart device and action devices that represent possible actions to be taken by the smart device; and a data structure for storing details of various media inputs and media outputs of said input devices and action devices; and a data structure for storing details of input action associations, each associating a media output of an input device with a media input of an action device.

Preferably the database further comprises: a data structure for storing details of input action combinations that comprise links to one or more input action associations.

Preferably the database further comprises: a data structure for storing details of input action sequences that comprise links to one or more input action combinations together with sequence information that defines an execution order for at least some of said input action combinations.

According to a further aspect, the invention provides a method of operating a workflow on a smart device, wherein the workflow comprises at least one input action pair association and wherein the or each input action association comprises an input device output associated with an action device input, the method comprising: creating instances of each input device required by the input action associations; loading data into each input device instance; creating instances of action devices; and triggering transfer of the loaded data from the input device(s) to the action device(s).

Different processing regimes may be used in preferred embodiments of the invention. In one preferred embodiment the workflow comprises at least one input action combination comprising a plurality of input action associations, and wherein the triggering step comprises triggering all loaded data to be transferred from the input device(s) to the action device(s) for all input action associations within the input action combination. Input action combinations will typically represent discrete and often self-contained tasks or actions (although they may be parts of larger workflows). Processing these input action combinations as units allows the different input action associations to be analysed and potentially processed in parallel where the underlying computer architecture permits such processing.

In other preferred embodiments the workflow comprises a plurality of input action combinations, each comprising at least one input action association, wherein the input action combinations each have a sequence attribute which identifies an order in which the input action combinations are to be executed, and each input action combination undergoes a step of transferring loaded data from its associated input device(s) to its associated action device(s), said transferring steps being executed in the order defined by the sequence attributes. As with the above, processing each step of the sequence in turn allows each step to be grouped and potentially executed in parallel, while still preserving the required execution order required by the sequence in order to ensure that later steps that depend on earlier steps will have the required inputs available to them. Also as described above, the sequence attribute may provide a sequence position indicator (e.g. a number) or it may indicate a next and/or previous input action combination in the sequence.

Many workflows will involve a number of tasks which are simply executed or not executed according to requirements, but each task has a definite outcome or sequence progression. However, at least one input action combination in a sequence may include a decision device which, when executed, is capable of altering the progression of the sequence. This allows more complex workflows to be created with the decision device being programmed with logic to analyse its inputs and to alter the processing of its outputs based on those inputs.

In other embodiments decision devices may not alter the progression of a sequence, but may alter which inputs are connected to which outputs. To achieve this a decision device may enable or disable certain input action pair associations for which it acts as an input device. Alternatively, or additionally, a decision device may transform one or more of its inputs to produce its outputs or generate new outputs based on its inputs, internal logic and configurable decision criteria. The configurable decision criteria may be input by the user, i.e. it permits a degree of programming of the decision device. This may be accomplished in a user friendly way, e.g. by presenting a number of options from a drop-down menu. The configurable decision criteria may be stored in the form of a text string representing (most likely in a shortened or compiled form) the configurations, options and/or alternatives set by the user.

In some preferred embodiments the transfer of loaded data from input devices to action devices is performed in groups, each group corresponding to one action device and the input devices that are associated with it via input action associations. This method of processing allows prioritization of the action devices to be controlled or influenced by the user. For example the user may define a workflow to have certain actions defined as more important than other actions. By grouping the input action associations to be processed by action device, all input action associations (pairs) associated with an action device can be executed together, thus achieving a certain processing task before execution of other action devices, even though such other action devices may be part of the same input action combination.

According to another aspect, the invention provides a software product comprising instructions which when executed by a computer cause the computer to: present to a user for selection a plurality of input devices, each representing a data input mechanism of said computer; receive from the user a selection of one or more of said input devices; present to the user for selection a plurality of action devices, each representing a possible action to be taken by the computer; receive from the user a selection of one or more of said action devices; wherein each input device has one or more input device outputs, and wherein each action device has one or more action device inputs, and wherein the instructions of the software product further cause the computer to form one or more input-action associations each comprising a selected input device output associated with a selected action device input.

The software product may be a physical data carrier. The software product may comprise signals transmitted from a remote location.

According to yet a further aspect, the invention provides a method of manufacturing a software product which is in the form of a physical carrier, comprising storing on the data carrier instructions which when executed by a computer cause the computer to: present to a user for selection a plurality of input devices, each representing a data input mechanism of said computer; receive from the user a selection of one or more of said input devices; present to the user for selection a plurality of action devices, each representing a possible action to be taken by the computer; receive from the user a selection of one or more of said action devices; wherein each input device has one or more input device outputs, and wherein each action device has one or more action device inputs, and wherein the instructions of the software product further cause the computer to form one or more input-action associations each comprising a selected input device output associated with a selected action device input.

According to a further aspect, the invention provides a method of providing a software product to a remote location by means of transmitting data to a computer at that remote location, the data comprising instructions which when executed by the computer cause the computer to: present to a user for selection a plurality of input devices, each representing a data input mechanism of said computer; receive from the user a selection of one or more of said input devices; present to the user for selection a plurality of action devices, each representing a possible action to be taken by the computer; receive from the user a selection of one or more of said action devices; wherein each input device has one or more input device outputs, and wherein each action device has one or more action device inputs, and wherein the instructions of the software product further cause the computer to form one or more input-action associations each comprising a selected input device output associated with a selected action device input.

It will be appreciated that all preferred aspects of the invention that have been described above in relation to one of methods, apparatus or software are equally applicable to all aspects of the invention and such preferred features are intended to be included in the scope of protection sought.

The invention acts at an architectural level, providing a new layer between the OS and the applications and facilitating inter-linking between applications.

Applications can be linked at one or more interfaces, via mechanisms provided by the system and according to a programming determined by the user. The system provides the linkage mechanisms and the programming means. By linking applications via the mechanisms, new functional workings can result, efficiencies of operation can be obtained and the system can operate to the desired customization of the user.

In this way the invention provides its effect irrespective of the data being processed (i.e. the values attached to the application inputs) and the applications being run (i.e. the applications being linked). The system can therefore enable and support a very wide range of end usages by the user connecting applications to the linkage mechanisms in a programmed way.

As an illustration of the versatility provided by the system, the following are examples of practical working that can be achieved by programming application connections to the linkage mechanism:

1) Restaurant Management System

Menu hierarchy with all food/drink items able to allocated against customer tables; taking orders/assigning to table, orders transferred to kitchen via cloud connection, updating stock levels, managing table bookings, maintaining social channels, storing reference information: wine lists, food/wine combination guidelines.

2) Journalist Interviews Workflow

Researching interviewee, preparing questions, audio recording interview, photographing interviewee and location, immediate transfer of key materials to office for transcribing/web uploading via cloud synchronisation; the interview workflow can be set to automatically invoke based on arrival at a defined interview location.

3) School Report Collation & Generation Workflow

Progressively throughout a period (e.g. a term or a year): noting child activity, recording next steps, capturing activity photos, linking to curriculum targets, teacher signing, cloud synchronisation; at the end of the period (e.g. end of term): collation & report generation, storing on school server, generating email to parent.

4) Custom Cake-Making Business Workflow

Commission name, commission description, capture event venue location as address/map, select cake from stock items or create custom via optional image search, book event; update social channels once commission has been completed; invoicing customer via email; research and storage of ideas/techniques for wide range of occasions cakes.

5) New Music Finding and Sharing Workflow

Ad-hoc finding and sharing new music and artists—music news, select artist, seek & play artists music, lookup Wikipedia article, lookup more artist information, share image and audio link via social channels, lookup and purchase concert tickets, store artist information for future reference; the music finding flow is normally manually invoked but can also be set to automatically invoke via an internet-side trigger, e.g. in the event of breaking news for user-specified artists or categories of artist.

6) Video Editor Daily Workflow

Web app for train times/platforms from house to video edit suite location in city, on train: collate/cloud sync emails relating to video edit, research/collate/cloud sync images relating to video edit, access broadcast guidelines for specific client, collate/cloud sync stock broadcast graphics for specific client, collate/cloud sync video sequences that will be used; on arrival at edit suite: all cloud synced items available in collated structures on desktop machine.

7) Physician Case Management System

Daily case notes/x-rays transferred to device via secure cloud, case notes processed and updated and re-uploaded to secure cloud from home location—reducing the amount of time needed to be spent in hospital vs at home office/family location; patient cases reviewed in surgery, reference images stored for display to patients as comparison with x-rays.

8) Playgroup Management System

Browse and collate ideas for playgroup craft activities, zoo trip, annual party; store ideas in notes folder and share with other playgroup organizers, social broadcast playgroup on/off status and location, including location with map; place call to other playgroup organizers.

9) Expenses Capture & Processing Workflow

Create trip/category, label and photograph expenses receipts, submit to notes/cloud service for manager approval; manager's flow has facility to approve and submit to company expenses department for payment processing; the expenses capture workflow can be set to automatically invoke daily at close of business.

All of the above example usages are facilitated by the provision of the new layer and the benefit of faster and easier inter-operability is therefore provided regardless of the specific usages/workflows that are programmed in practice.

Furthermore, the invention significantly eases programmability, providing non-skilled users with the means to program. Users are able to connect application interfaces to the linkage mechanisms in a way that is natural, intuitive and where the new functions being created are clearly comprehensible in nature.

A device (e.g. a smart device) implementing the system of the invention is, in a real practical sense, an improved device, because not only does it introduce to users the means to program workflows, it introduces this means also to users who are non-skilled.

As well as the benefit of being able to quickly create functionality to a user desired specification, additional benefits of cost reduction and time-saving result as an application programmer (or development team) may not need to be hired, and app store submission and approval processes can be avoided.

The system is also able to provide templates of pre-programmed functions (e.g. 'restaurant workflow', 'interview workflow', etc.)—the user is at liberty to use these as starting points for their own programming, modify them, add to them or remove from them.

The invention has an effect outside of the computer in its facilitation of programmability and execution of workflows that combine different inputs and outputs and link various applications, allowing real world jobs to be carried out faster, more efficiently and more reliably.

The computer can perform certain tasks more efficiently and effectively in that there is less need to switch between apps, perform copy and paste operations and/or re-enter inputs.

The invention thus provides a new way of operating a computer in that it is fundamentally input-driven or action-driven rather than application-driven; and it is from this new way of working that significant benefits are derived. The user can therefore operate the computer in a different way to a conventional operating system setup.

Preferred embodiments of the invention will now be described, by way of example only, and with reference to the accompanying drawings in which:

FIG. 4 shows a data model including sequencing elements of further embodiments of the system;

FIG. 5 illustrates an example of Decision Devices;

FIG. 6 illustrates sequencing of certain embodiments;

FIG. 8 shows screenshots illustrating the execution of a workflow;

Figure 10:
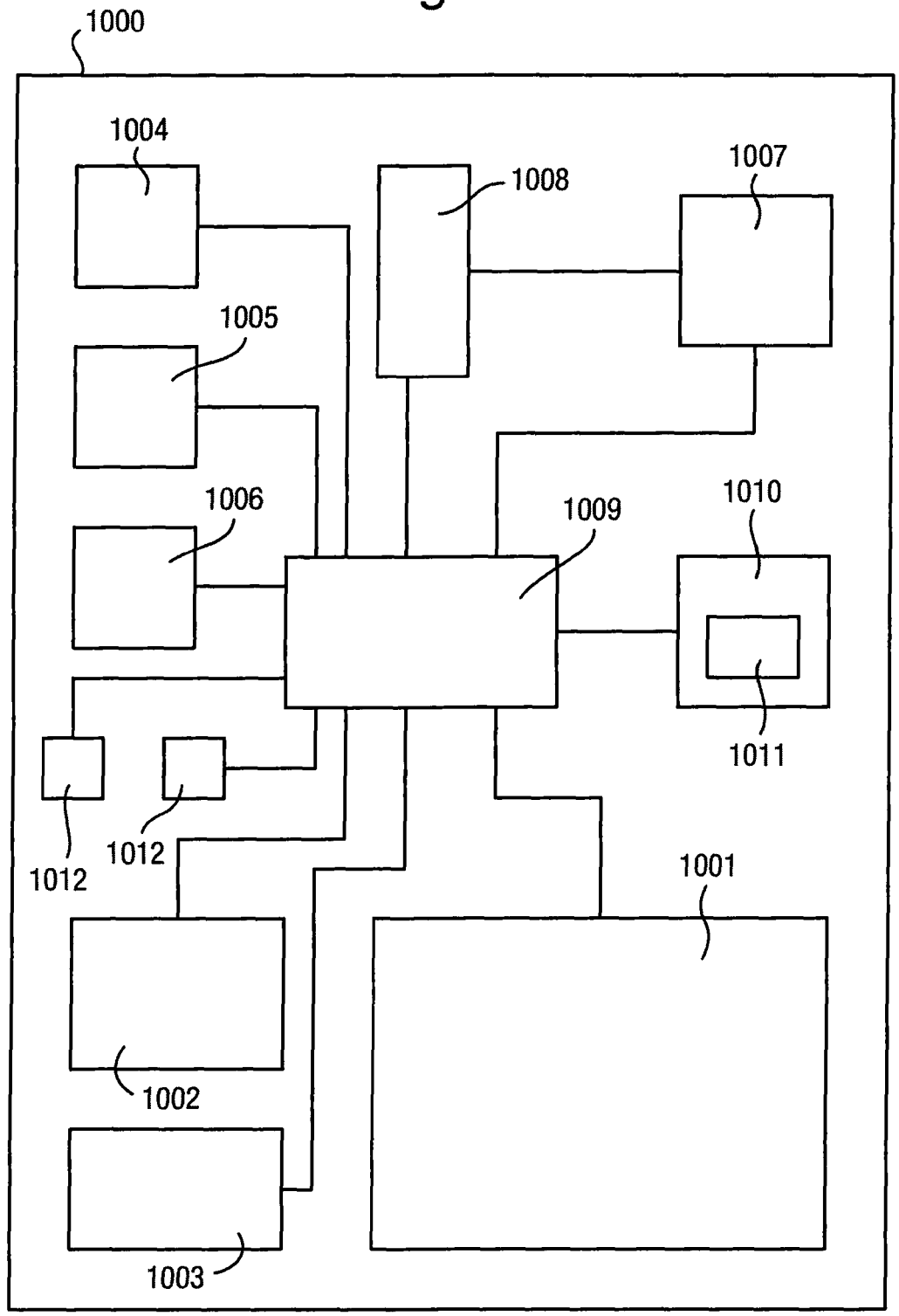

FIG. 10 schematically illustrates hardware elements associated with the system.

Smart devices such as smart phones and tablets (and wearable tech such as smart glasses and smart watches) have numerous input devices available to the user and can perform numerous tasks. In order for a user of such a device to create a workflow, the inputs necessary for the workflow need to be harnessed and coupled to one or more action devices to process the inputs and perform tasks.

From a general overview, the system models the capabilities of the smart device through software objects called Devices. A Device (D) is a fundamental component in the system. Devices typically have a clear functional focus, centred on capturing input or processing input. Devices make their intrinsic functionality accessible via Media Interfaces (MIs), specifically: Device Inputs (DIs) (a set of MIs via which the device can receive inbound media) and Device Outputs (DOs) (a set of MIs via which the device can supply outbound media). Devices can be combined with other Devices via mutual connection of MIs—to form specific units of work.

A device is normally oriented to be either an input capture device, (or Input Device, ID), an action processing device (or Action Device, AD) or an intermediate processing device (or various types of Intermediate Device). However hybrid devices are also possible which can act in more than one operating mode, e.g. as both an ID and an AD, or a device that is primarily an AD, but can act in ID mode for connection to another AD.

Some examples of Devices are as follows:

| Input Devices | Action Devices |
|---|---|
| TEXT capture | MAIL sender |
| AUDIO capture | NOTES folder |
| IMAGE capture | CLOUD file system |
| IMAGE capture and processing | AUDIO RIGHTS resolver |
| VIDEO capture | another APP (local or remote) |
| AMBIENT CONTEXT capture | WEB APP load |
| SPEECH RECOGNITION capture | SPEECH-TO-TEXT convert |
| BAR CODE capture | IMAGE annotation |
| input from another APP (local or remote) | PHONE CALL set-up |
| | LANGUAGE TRANSLATION |
| | SOCIAL NETWORK post |

As well as outputs, an ID clearly must also have input arrangements. Likewise, as well as inputs, an AD clearly must also have output arrangements. In practice, an ID (or ID-mode Device) might normally receive its input in from the user via a User Interface (UI) or it might receive its input from a data source of the smart device. For example, a location ID may receive its input from a GPS function of the smart device (e.g. via an operating system API) or an image capture device may receive its input from a camera of the smart device. An Input Device may receive its input from the user's ambient context. This could be a combination of location, accelerometers, microphone noise level and/or various other sensors.

An ID (or ID-mode device) may also be able to receive (and supply on) input from programmatic sources (e.g. previous actions, external logic etc.).

An AD (or AD-mode device) might supply its output to the user via a device User Interface (UI) such as a screen of the smart device by displaying text or pictures, but may also (or alternatively) supply its outputs to programmatic destinations such as further actions, external logic, etc.

An ID may itself perform some internal processing on the input before presenting its output. This could involve further input or interaction from the user. For example an the image capture and processing device listed above may prompt the user to select or take an image and then further prompt the user to annotate or crop the image.

Whilst IDs and ADs are capable of direct connection (as will be seen), an intermediate device can provide specific interworking (e.g. functional and/or interface conversion) between IDs and ADs as well as decision working to enable a next ID/AD to be determined. Specific interworking may be required in cases where there is some incompatibility in functional or interface working between ID and AD. This could arise for example in cases where devices have been created by different organisations and specific interworking may provide the most efficient means of resolving the incompatibility. Decision working enables branching in the system as will be seen later. The general mechanism for operation of intermediate devices may be to utilise a hybrid device mode: presenting as an AD from a source ID perspective and an ID from a target AD perspective.

Devices are formed via modelling a function and its essential interfaces. Its functionality is defined, its interfaces are determined, defined (named) and typed and the function and interfaces then need to be implemented and/or implementations gathered. The function then needs to be made available from the device interfaces. Hosting of the functionality could be local, remote or a hybrid of these.

Two examples of Devices modelled in terms of MIs (MI types shown) are:

An Input Device:

| TEXT DEVICE | |
|---|---|
| Device Inputs (DIs) | Device Outputs (DOs) |
| (UI view) | interface-TEXT__TEXT_OUT (type: Text) |

An Action Device:

| NOTES DEVICE | |
|---|---|
| Device Inputs (DIs) | Device Outputs (DOs) |
| interface-NOTES__BODYTEXT_IN (type: Text) | (UI view) |
| interface-NOTES__IMAGE_IN (type: Image) | interface-NOTES_FILE_OUT (type: Note) |
| interface-NOTES__BODYRICHTEXT_IN (type: Rich Text) | |

The (UI view) references above are inputs or outputs to/and from the user via a User Interface such as a device touchscreen.

As described above, an Input Device has one or more output Media Interfaces and an Action Device has one or more input Media Interfaces. An Input-Action Pair (IAP) is a pairing of a single output MI with a single input MI. This pairing provides an association between Devices, more specifically an association between Media Interfaces of two Devices. An IAP can be considered as the most basic work unit in the system.

Where a Device has more than one output MI or more than one input MI, it is necessary to select which output and/or which input are paired together to form an IAP. As an example, a Mail Device may have three inputs, namely 1) a contact input to receive information on the destination address(es) for generating an e-mail, 2) a subject text input for receiving a subject for the e-mail and 3) a body text input for receiving a body of the e-mail. The Mail Device may have other inputs as will be discussed later.

Just as an Action Device may have multiple inputs, an input device may have multiple outputs. For example a Camera device could output a video as either (or both of): 1) a movie file, or 2) a set of still images.

Device inputs and outputs typically have a well-defined Media Type (MT), i.e. it is known in advance what form of data is to be sent or received on that interface, although this need not always be the case. In other cases, inputs and outputs can be loosely typed, allowing different types of data to be transferred across the interfaces, with type conversion being handled dynamically where necessary. However, where inputs and outputs are typed, the matching (pairing) of inputs and outputs can be facilitated by requiring that the output Media Interface Type of an Input Device matches the input Media Interface Type of an Action Device.

Consider the following example:
A TEXT Device has the following interfaces:
DI: (not set)
DO: interface-TEXT_TEXT_OUT-1
The Media Interface (MI) named: interface-TEXT_TEXT_OUT-1 has a Media Type (MT) of: Text
A MAIL Device has the following interfaces:
DI set:
 #1: interface-MAIL_SUBJECTTEXT_IN-1
 #2: interface-MAIL_BODYTEXT_IN-1
 #3: interface-MAIL_AUDIO_IN-1
 #4: interface-MAIL_IMAGE_IN-1
DO: (not set)
The MI named: interface-MAIL_SUBJECTTEXT_IN-1 has an MT of: Text
The MI named: interface-MAIL_BODYTEXT_IN-1 has an MT of: Text
The MI named: interface-MAIL_AUDIO_IN-1 has an MT of: Audio
The MI named: interface-MAIL_IMAGE_IN-1 has an MT of: Image Note that the list of interfaces for the above Devices is not exhaustive. For example, the MAIL Device may have other interfaces such as for receiving addressee information.

Instances of TEXT Device provide a single DO MI (Device Output Media Interface) which is able to be connected to either the body text DI MI (Device Input Media Interface) or subject text DI MI on the MAIL Device. However that device is not suitable for pairing with the Audio or Image DIs as those expect a Media Type of Audio or Image respectively which is not provided by the TEXT device.

A powerful aspect of the use of devices with input and output interfaces, particularly typed interfaces is that devices are able to be dynamically combined to form units of work or 'tasks' in a very easy manner. If an interface type of an ID mode device matches an interface type of an AD mode device then these devices can be connected together at these interfaces. This connection can result in new and unprecedented functional working within the smart device without the need for the user to undertake complex programming tasks. This dynamic task formation is placed in the hands of users to enable them to construct tasks and systems that support them in their activities, routine or otherwise. By virtue of the modelling of the smart device's functionality and the underlying data structures as described here, the user can create functionality that was not otherwise available without having to write a dedicated application (which could be a complex programming task, beyond the skill of most users). Additionally, a number of preconfigured tasks can be supplied to users as part of the system default configuration, although these are really dynamic constructs of the same nature and can be modified or linked as described elsewhere in this document.

Figure 1:
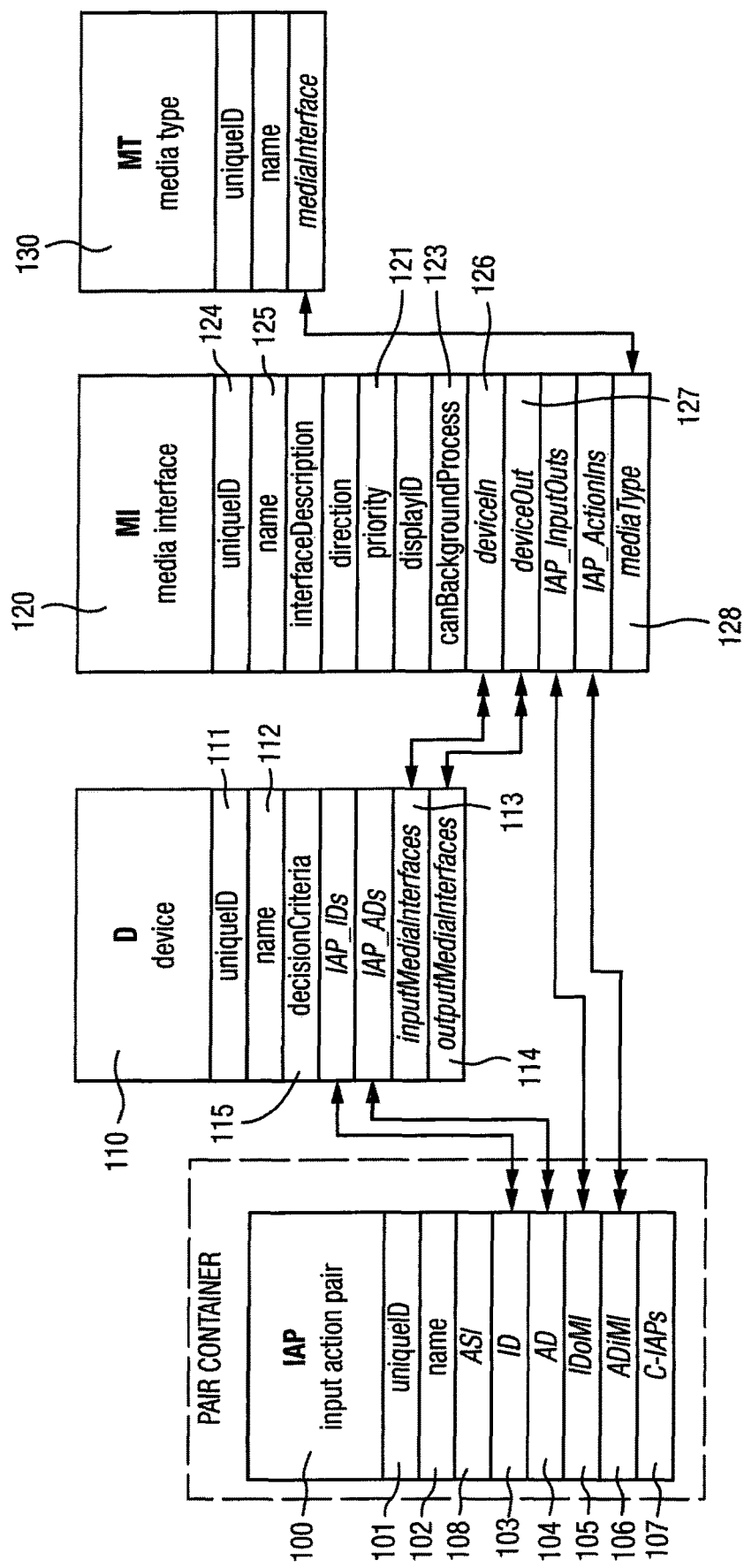
FIG. 1 shows a data model for some basic embodiments of the system.

The basic data model underlying the IAP structures of the preferred embodiments of the invention described here is shown in FIG. 1. The data model describes the basic objects which are used to define a workflow or task to be carried out.

While the most basic data component is a Device, the most basic work unit is an input-action pair (IAP) which is an association between an output from an input device (ID) and an input to an Action Device (AD).

Some examples of IAPs are as follows:

|  | ID mode Device |  | AD mode Device |
|---|---|---|---|
| IAP 1: | TEXT D | --> | MAIL D |
| IAP 2: | TEXT D | --> | NOTES D |
| IAP 3: | NOTES D | --> | CLOUD D |

For example, in IAP 1 above, a Text device operates as an Input Device and a Mail Device operates as an Action Device. The output of the Text Device is paired to (associated with) an input of the Mail Device. Similarly, in IAP 2 the output of the Text Device is paired to an input of a Notes Device. In IAP 2 a Notes Device is acting as an Action Device. In IAP 3, a Notes Device is operating as an Input Device and its output is paired to an input of a Cloud service Device (e.g. a cloud storage system).

Another example of an IAP is one which would supply a user's search text to a dictionary:
Text ID (interface: text_out) →Dictionary AD (interface: search_text_in)

The Text ID would use its input arrangements (probably providing an editable text box via a UI) to obtain a search term from the user. Upon activation, the Text ID provides the search term on its Media Output interface. The IAP links that output with the Media Input interface of the Dictionary Device which therefore receives the user's inputted text and performs a suitable dictionary lookup. The Dictionary AD then uses its output arrangements (e.g. outputting text to a UI) as part of performing its action. Note here that both the text_out MI and search_text_in MI have a common MT type of 'text'.

FIG. 1 shows the data model for IAPs. Each IAP 100 is given a name 102 and a unique identifier 101 (UniqueID in FIG. 1). Each IAP 100 also has six relationships defined: 1) ID 103, 2) AD 104, 3) IDoMI 105, 4) ADiMI 106, and 5) C-IAPs 107 and 6) ASI 108. These are, respectively, 1) an identifier of the Device instance which forms the Input Device of the IAP, 2) an identifier of the Device instance which forms the Action Device of the IAP, 3) an identifier of the Media Interface 120 which forms the ID output of the IAP, 4) an identifier of the Media Interface 120 which forms the AD input of the IAP, and 5) and 6) relationships to other structures which refer back to it (described in more detail later in this document). As each Media Interface (MI) 120 has a unique identifier 124 and is associated with a unique Device instance (via relationship 126 or 127), the ID and AD relationships 103, 104 of the IAP 100 are in fact redundant as that information could be obtained indirectly via the MIs.

However, there are programmatic advantages to retaining the direct ID and AD relationships as they simplify the programming.

FIG. 1 also illustrates the Devices 110. Each Device 110 has a given name 112 and unique identifier 111. Each Device 110 also has relationships 113, 114 to each of the Media Interfaces 120 associated with that Device 110. Similarly, each Media Interface 120 has a given name 125 and unique identifier 124 and has a relationship 128 to its Media Type 130.

The Device entity 110 also contains a Decision Criteria attribute 115 which can be used to determine a Decision Result 415 that can alter the progression of an Input Action Sequence 400 (described in more detail later).

The various relationships between these data structures 100, 110, 120, 130 are illustrated by the arrows in FIG. 1. A double arrow head indicates a many-to-one relationship. For example, the relationship between the IAP ADiMI 106 and the Media Interfaces 120 shows a double arrow head next to the IAP ADiMI 106, but only a single arrow head next to the Media Interface 120. This shows that an IAP can only be associated with a single Media Interface for its ADiMI 106 (a single unique Media Interface identifier 124), but a single Media Interface identifier 124 could be associated with the ADiMi of many IAPs 100. Thus, several IAPs 100 could feed data into a single common device interface, or to put it another way, a single common device interface could be used by several IAPs 100.

The Media Interface entity 120 contains a Device Default Priority attribute 121 which can be used to define a priority order for the media interfaces 120 of each Device 110 which can be used to define a display order for the interfaces when presenting them to the user. For example, in a MAIL Device, the body text interface may be given a higher priority than the subject text interface so that the user is first presented with the opportunity to fill in the more substantive information. These default priorities can be overridden by higher level IAP (actually C-IAP in this embodiment as described later) priority attributes 311, 312.

The Media Interface entity 120 also has a Background Processing flag attribute 123. This flag is set if the Media Interface is known not to lead to any further interrupts (e.g. requiring confirmation or further input from a user) and thus can be used to prioritize processing, i.e. these interfaces can be sent for processing ahead of others so as to facilitate parallel processing while other interrupts may be provided by other interfaces. Again, this setting can be overridden by higher level prioritizations if desired.

Although a simple task may involve only a single IAP as in the dictionary example above, several IAPs may be combined to form a Compound Task, i.e. a group of IAPs. For example, consider a Mail Sending AD, which has multiple inputs: 1) subject text, 2) body text, 3) attachment data. For an email to be constructed with subject, body text and attachments, multiple IDs must be paired with a single Mail AD instance. In IAP terms an IAP must be defined for each ID and AD pairing and these are then collected into a single group. In this document, this IAP grouping is termed an Input Action Combination (IAC). In effect an IAC is a container for one or more IAPs that together form an overall compound task. Like IAPs, IACs are software objects with certain attributes and relationships.

The IAPs in an IAC may refer to the same instance of a Device or they may refer to different instances of a Device. For example, if a text item is to be posted simultaneously to both Twitter and Facebook, then a single instance of a Text Input Device is paired to two different Action Devices (one Twitter AD and one Facebook AD). However, in the Mail Action Device example above, a single instance of the Mail Device receives text inputs from two different instances of the Text Device, one for the subject text and one for the body text.

As illustrations of this, consider the following six IAC examples where the # value represents the device instance. These are illustrated in FIGS. 2A-2F. In those Figures, the lines between Devices represent the IAPs.

(1) An IAC for a Mail task may comprise the following IAPs:

Text ID #1 (interface: text out)→Mail AD #1 (interface: subject text in)

Text ID #2 (interface: text out)→Mail AD #1 (interface: body text in)

Audio ID #1 (interface: audio out)→Mail AD #1 (interface: attachment in)

Image ID #1 (interface: image out)→Mail AD #1 (interface: attachment in)

Figure 2A:
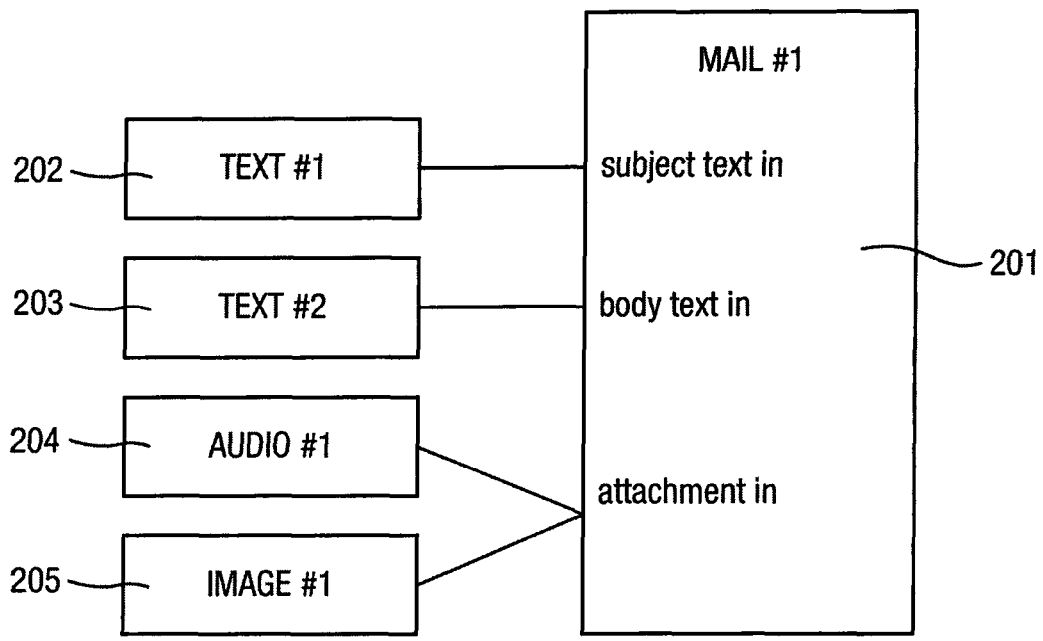
FIGS. 2A-2F illustrate various examples uses of the system.

This example is illustrated in FIG. 2A. A single instance of a Mail Device (AD) 201 receives inputs from four separate IDs—a first Text ID 202, a second Text ID 203 (a separate instance of the Text Device), an Audio ID 204 and an Image ID 205. This example illustrates multiple IDs connecting to multiple interfaces of one AD. It also illustrates multiple IDs connecting to the same interface of one AD (both the Audio ID 204 and Image ID 205 connect to the attachment in interface of Mail AD 201).

(2) an IAC for a Twitter task may comprise the following IAPs:

Text ID #1 (interface: text out)→Twitter AD #1 (interface: tweet text in)

Image ID #1 (interface: image out)→Twitter AD #1 (interface: tweet image in)

Figure 2B:
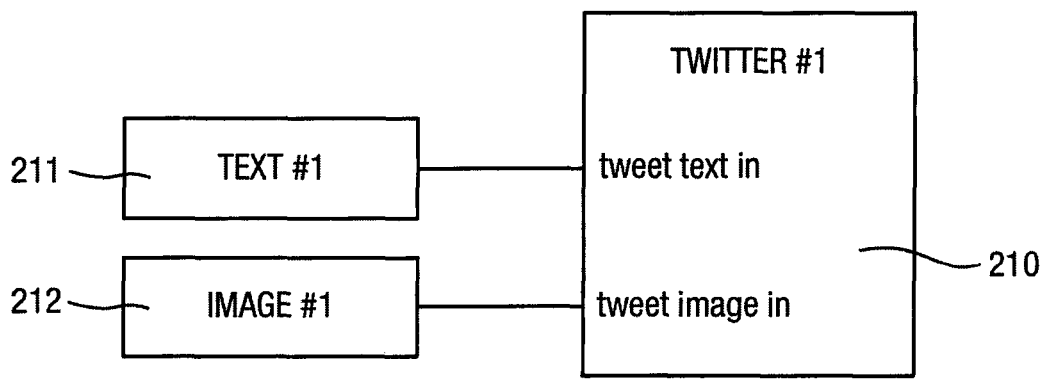

This example is illustrated in FIG. 2B. A single instance of a Twitter AD 210 receives inputs from two separate IDs—a Text ID 211 and an Image ID 212. The two input IDs 211, 212 are connected to different interfaces on the AD 210. This example illustrates an IAC in which multiple IDs connect to a single AD.

(3) an IAC for a multiple posting to Twitter and Facebook may comprise the following IAPs:

Text ID #1 (interface: text out)→Twitter AD #1 (interface: tweet text in)

Text ID #1 (interface: text out)→Facebook AD #1 (interface: status text in)

Figure 2C:
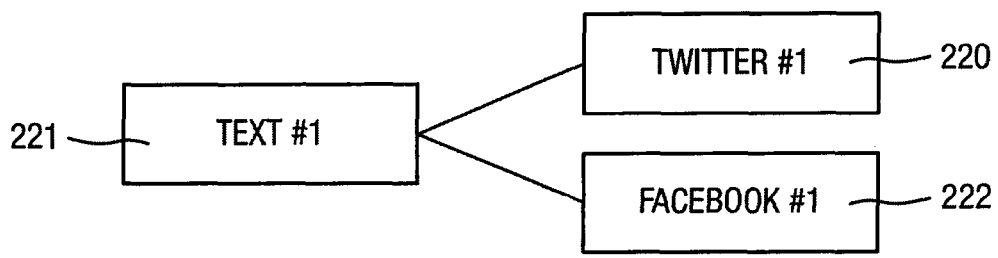

This example is illustrated in FIG. 2C. A single instance of a Twitter AD 220 receives input from a single instance of a Text ID 221. Similarly, a single instance of a Facebook AD 222 receives input from the same single instance of the Text ID 221. In this example, the user can input text once and have it directed efficiently to two separate targets (the two ADs).

(4) an IAC for a Wikipedia task may comprise only one IAP:

Text ID #1 (interface: text out)→Wikipedia AD #1 (interface: search text in)

Figure 2D:

This example is illustrated in FIG. 2D and is similar to the dictionary example described above. A single instance of the Wikipedia AD 230 receives input from a single instance of the Text ID 231.

(5) an IAC for collecting text to send as an email and an image to post to twitter:

Text ID #1 (interface: text out)→Mail AD #1 (interface: body text in)

Image ID #1 (interface: image out)→Twitter AD #1 (interface: tweet image in)

Figure 2E:
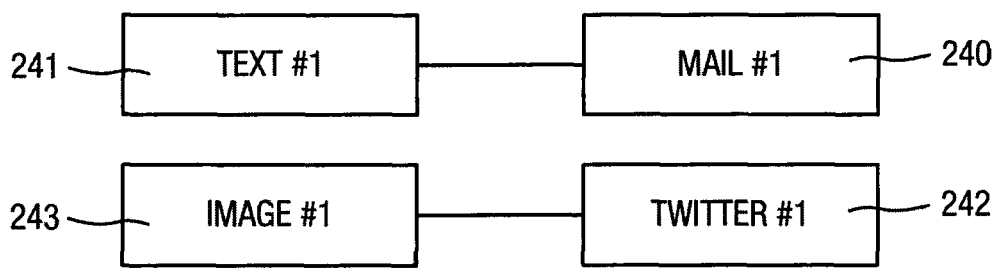

This example is illustrated in FIG. 2E. A single instance of a Mail AD 240 receives input from a single instance of a Text ID 241. Similarly, a single instance of a Twitter AD 242 receives input from a single instance of an Image ID 243. In this example, the two IAPs are completely separate, but are still grouped into a single IAC 244 (indicated by a broken line) as they form part of an identified workflow in which a user collects text and an image, sends the text in an email and posts the image to Twitter.

(6) an IAC for collecting text and an image for posting to separate twitter feeds:

Text ID #1 (interface: text out)→Twitter AD #1 (interface: tweet text in)

Image ID #1 (interface: image out)→Twitter AD #2 (interface: tweet image in)

Figure 2F:
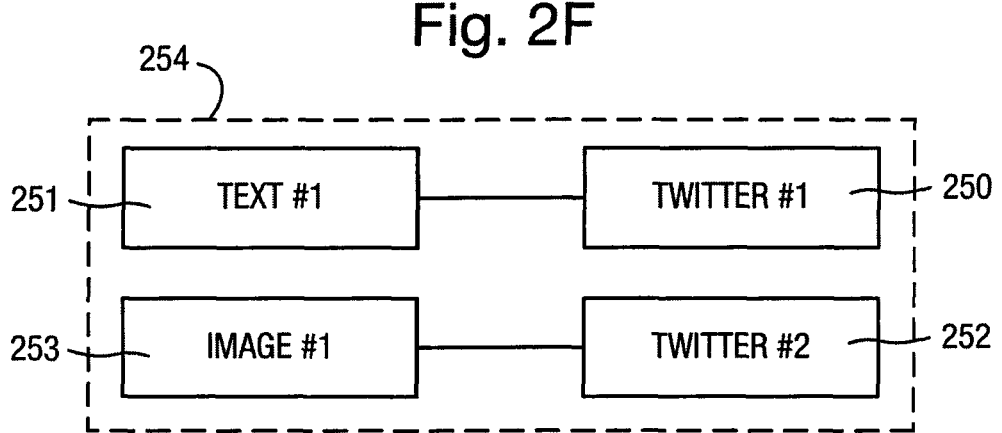

This example is illustrated in FIG. 2F. A first instance 250 of a Twitter AD receives input from a single instance of a Text ID 251. A second instance 252 of a Twitter AD receives input from a single instance of an Image ID 253. As with example (5) above, the two IAPs in this example are completely separate as they relate to separate instances of the Twitter AD, but they are still grouped into a single IAC 254 as they form part of an identified workflow in which a user collects text and an image, posts the text to one Twitter feed and posts the image to a different Twitter feed.

As illustrated above, Input Devices and Action Devices may be connected together via IAPs, but need not be connected in a one-to-one fashion. Instead, many-to-one, one-to-many or many-to-many connections are possible (as well as one-to-one). However, each connection is always defined by an IAP.

Examples 1 and 2 above (FIGS. 2A and 2B) represent a Common AD IAC in which multiple IDs feed into a single, common AD (the Mail AD in FIG. 2A and the Twitter AD in FIG. 2B).

Example 3 above (FIG. 2C) represents a Common ID IAC in which a single, common ID (the Text ID) feeds into multiple separate ADs.

Examples 5 and 6 above (FIGS. 2E and 2F represent a Diverse ID-AD IAC in which multiple IDs connect to multiple ADs (or instances of an AD).

It will be appreciated that more complex arrangements may be created with multiple IDs (and/or multiple instances of IDs) feeding to multiple ADs (and/or multiple instances of ADs) with multiple IDs each feeding multiple ADs and multiple ADs (or interfaces of ADs) receiving input from multiple IDs. In each case, every connection between an ID output interface and an AD input interface defines a separate IAP within the IAC.

Figure 3:
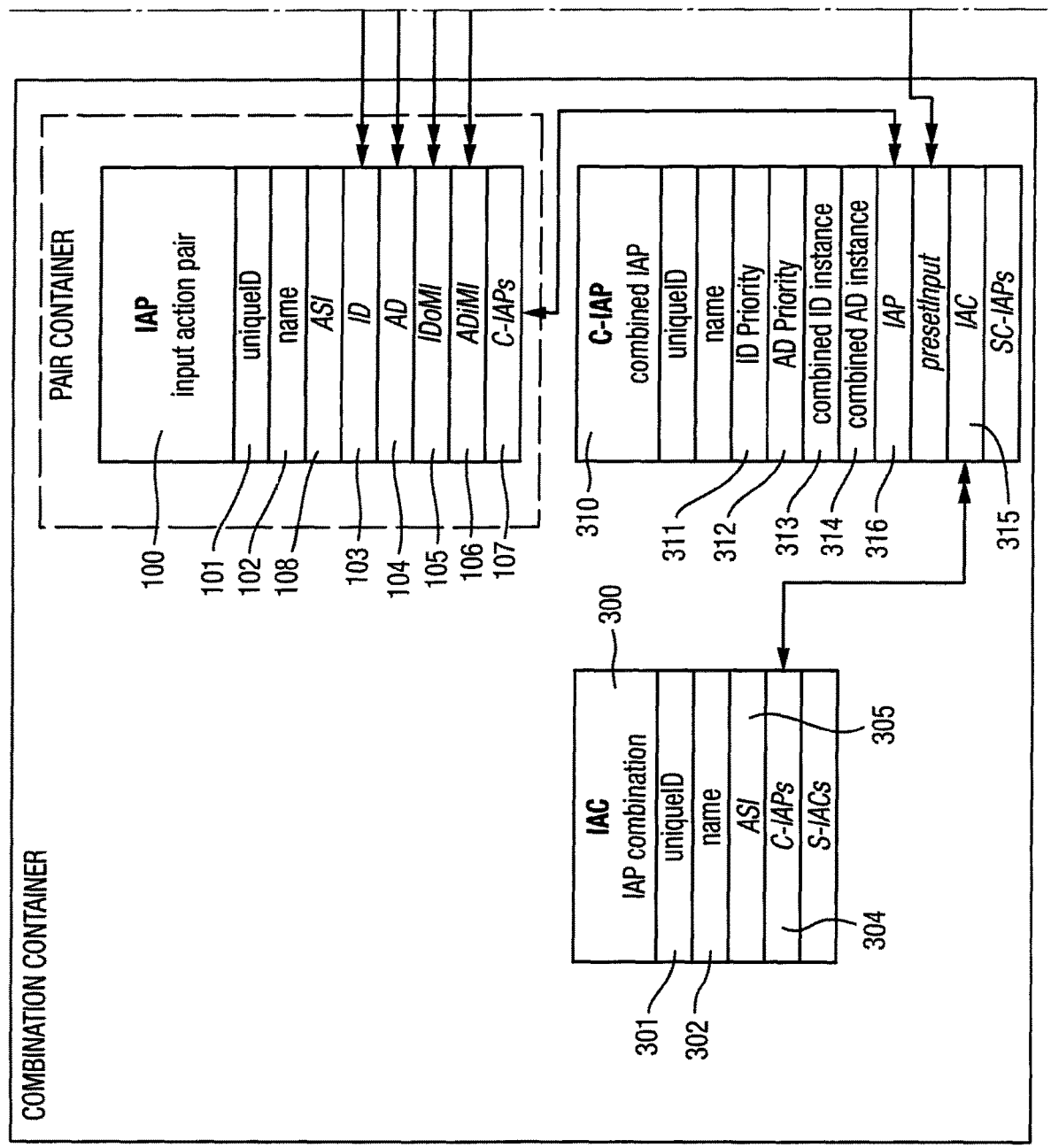
FIG. 3 shows a data model including combination elements of other embodiments of the system.
Figure 3:
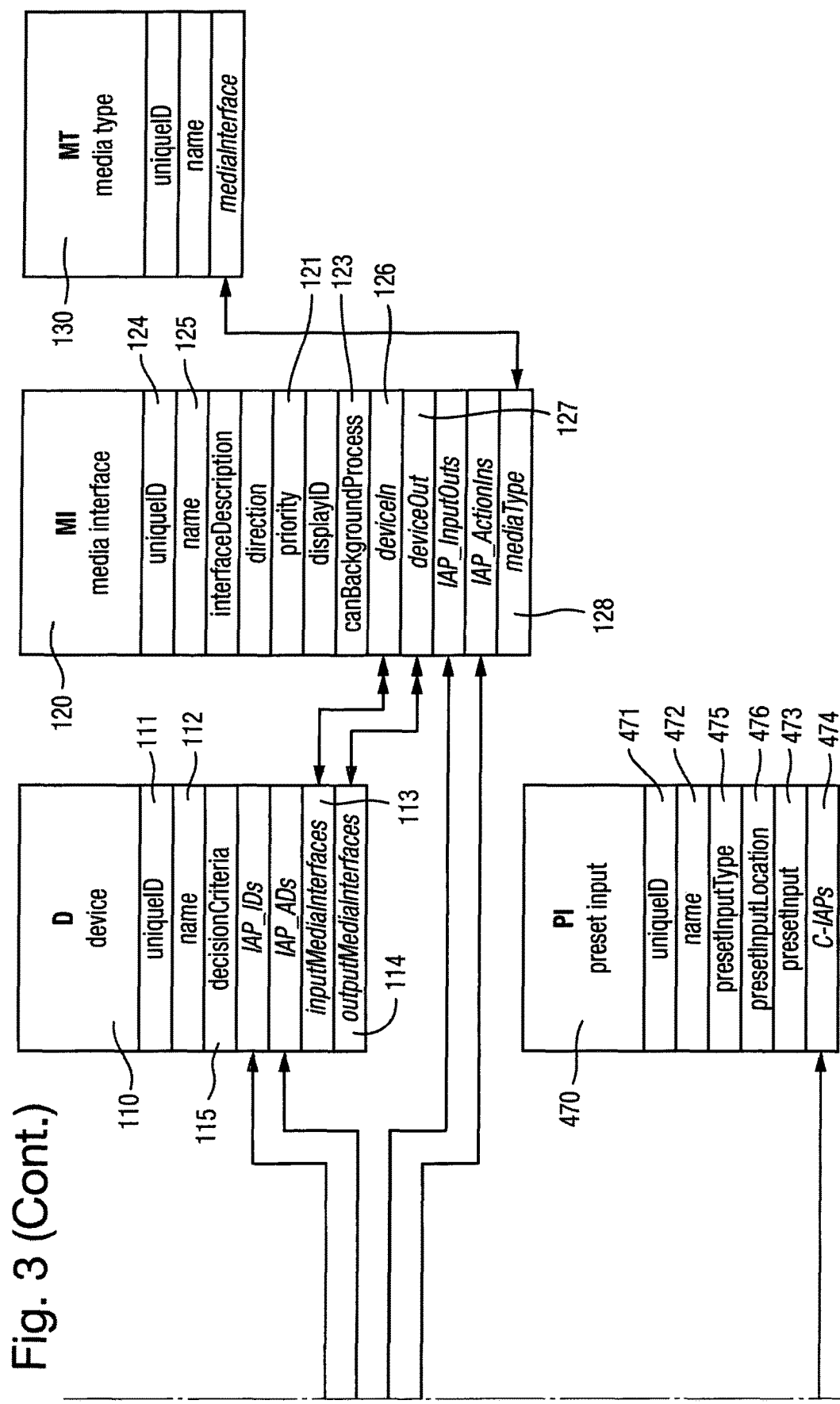

FIG. 3 illustrates the extension of the IAP data model to encompass IACs. The IAPs 100, Devices 110, Media Interfaces 120 and Media Types 130 are the same as in FIG. 1. IACs 300 are added in this model, each IAC 300 having a unique identifier 301, a name 302 and relationships 304 to one or more IAPs (actually C-IAPs in this embodiment—see below). The relationship between IACs and C-IAPs is a one-to-many relationship as a single IAC 300 can include many C-IAPs, but a C-IAP can only belong to one IAC 300.

The relationship between an IAC 300 and an IAP could be a direct relationship to an IAP data entity 100. However, a further data entity is illustrated in FIG. 3, being essentially a child of IAP 100, called a C-IAP 310 (or Combined-IAP). The reason for introducing a C-IAP 310 is that once an IAP 100 has been created, it may be desirable to use it several times in different IACs 300 defined by the user. Within an IAC, there may be a need to add other attributes to an IAP such as its priority within the IAC (e.g. to determine which UI interfaces should be presented to a user first). This will likely be different for different IACs and therefore each IAC needs to retain its own information relating to the IAP. One way to do this may be via a parent/child relationship. The parent IAP 100 (with the basic attributes discussed above) is created first. When an IAC 300 is created, each C-IAP 310 is created as a child of the relevant IAP 100, inheriting all properties of the parent IAP 100 and with the additional attributes necessary for defining the IAC 300, in this case ID priority 311, AD priority 312, combined ID instance 313 and combined AD instance 314. The C-IAP 310 also has an IAC relationship 315 towards the IAC 300 that uses it. In such cases, it is also necessary for the child object to inherit the values (not just the structure) of the parent object, or to be assigned those values on creation. However, with this arrangement changes to the values of the parent will not automatically propagate to its children. Therefore, instead of using inheritance, it is preferred that the child object (the C-IAP 310) contains a relationship 316 to its parent object (the IAP 100), e.g. an attribute that points or links to the parent object. The values of the parent object are thus accessed directly from all of its children, avoiding the value propagation issue described above. With this arrangement, the IAPs 100 are reusable, and so can belong to more than one IAC 300, whereas the C-IAPs 310 are purposely tied to an IAC and so can only belong to one IAC 300.

The ID priority field 311 can be used to define the preferred priority of the various inputs within an IAC 300. For example, in a Text to Mail example, there may be two text input fields, one for the body text of the email and one for the subject. A user may prefer to be prompted first for the body text as that will likely be what is forefront in his or her mind, so it is preferable to be able to enter it first. To achieve that, the IAP 100 associated with the Text Device (ID) and the body text Media Input of the Mail Device (AD) is given an ID priority higher than that for the IAP associated with the Text Device (ID) and the subject text Media Input of the Mail Device (AD).

The AD priority field 312 is similar, but can be used to affect the order in which multiple ADs operate. The order of AD operation may be important in some circumstances. For example, in a workflow in which a note is stored in a cloud storage service and a confirmation email is to be sent to the user's email address, the saving step should be initiated before the confirmation email step as the backup is of a higher priority. This can be achieved in a similar manner as described above, using the AD priority field 312. In this example, the IAP associated with the cloud storage AD input is given a higher AD priority than the IAP(s) associated with the Mail device input(s).

The combined ID instance 313 and combined AD instance 314 attributes allow an IAC 300 to refer to multiple instances of the same type of device. For example, a single IAP 100 can only ever relate to a single ID and a single AD and therefore there is no ambiguity at that level. However in an IAC 300 with multiple IAPs 100, separate IAPs 100 may refer to different IDs of the same type. For example an IAC 300 for collecting text and generating an email will have an IAP 100 for body text to mail and an IAP 100 for subject text to mail. These two IAPs 100 need separate instances of the TEXT device so as to collect two separate text strings (although both IAPs 100 relate to the same MAIL device). Therefore at the IAC level, it is necessary for IAPs 100 to specify which instance of a Device (ID or AD) they relate to. The combined ID instance attribute 313 is used to distinguish between different ID instances and the combined AD instance attribute 314 is used to distinguish between different AD instances.

Tasks as outlined above are concerned with input-action processing arrangements that practically occur as part of a single parallel input load cycle and a single parallel action execute cycle.

In real world scenarios, a workflow may require use of multiple IACs 300. For example, a workflow for a workman preparing a quote at a property may involve a) taking some photographs, b) dictating an audio description, c) taking some measurements in the form of a note and d) emailing all this information back to the office for preparation of a quote document to be sent out to the client.

Steps a), b), c) and d) may each be an IAC 300. Some steps, e.g. steps a), b) and c) may by IACs 300 with only a single IAP 100. Step d) is an IAC 300 with multiple IAPs 100 (e.g. for body text, subject text, addressee and attachment data). These four IACs 300 may be grouped together into a workflow, known in this document as an Action Stack (AS) 450 (see FIG. 4). This is essentially a group or set of IACs 300 associated with a single workflow and provides easy access for a user to see all tasks that need to be accomplished as part of that workflow.

In some cases the IACs 300 within an Action Stack 450 can be carried out in any order, or some of them may be optional. In other cases, there may be a defined order to the steps (or at least to some of them) such that some steps cannot be carried out until other steps have been fulfilled. This leads to the concept of an IAC sequence (IAS) 400 in which certain IACs 300 are presented to the user requiring fulfillment before other IACs 300. Upon fulfillment of an IAC 300 in an IAS 400, the next IAC 300 in the sequence is presented to the user. In the example above, the email cannot be generated until all of the attachments have been created, so that Action Stack 450 may be better set up as an IAS 400, e.g. with the steps a), b), c), d) to be carried out in that order. Although steps a), b) and c) could be carried out in any order without hindering the workflow, it will often be best to have a defined order for all steps to provide structure and familiarity to the workflow as the steps are always carried out in the same order. In other cases it may be better to allow flexibility within the non-order-specific steps so as to allow maximum freedom to the user of the workflow to complete the task in the most efficient manner for the particular situation.

Three main benefits of sequenced workflows can be identified. Firstly, step-by-step working is facilitated. Secondly, IAC linking is possible, i.e. where the output of one IAC is fed into another IAC, thus making the second IAC dependent on the first. Thirdly, workflows can involve decision making steps and consequently branching of the workflow where the outcome of one processing step determines what action is taken subsequently.

Firstly considering step-by-step working. A set of discrete IACs 300 can be grouped into a sequence to produce a set of functions that are executed step by step. For example, consider an IAS 400 which contains IAC 1 and IAC 2 below, i.e. step 1 is to collect TEXT and then send it to NOTES, step 2 is to collect IMAGE then send it to NOTES:

| IAC # | ID | AD |
|---|---|---|
| IAC 1 | (TEXT D)1/out/text | --> (NOTES D)1/in/body rich text |
| IAC 2 | (IMAGE D)1/out/image | --> (NOTES D)1/in/body rich text |

If it is to be guaranteed that the NOTES Device receives the text before the image then these two IACs need to be sequenced in the order listed. Upon execution, the user would be presented with only the text input interface, once text had been entered and sent to the NOTES Device, the IAS would move on to step 2 (IAC 2) and present the user with the image input interface. Thus step-by-step working is ensured.

It should be noted that the above example also illustrates a scenario in which the Media Interfaces need not always match in type. In this example the body rich text input can accept either text or image inputs.

Secondly, considering IAC linking, an output of one IAC can be used to drive the input of another IAC. Moreover, the linking mechanism can identify dependencies between the different IACs. This can be useful in situations where not all steps need to be sequenced, but some steps depend upon the completion of other steps. For example, in the example above where a workflow involves gathering a) Image data, b) Audio data and c) Text data, then d) sending an email, the first steps a), b) and c) could be performed in any order. However, d) depends on a), b) and c). Therefore by linking d) to each of a), b) and c) the dependencies are specified. The user can be given freedom to select the order of steps (IACs), while an error message will be generated if step d) is initiated without its dependencies a), b) and c) having been executed. Alternatively, the IAC 300 for step d) can be made unavailable (this may be indicated by displaying it on screen in a different colour, e.g. greyed out) until the dependencies have been fulfilled.

It should be noted that it is possible for the linked output to come from an earlier (so not necessarily the immediately preceding) IAC 300 in the group, and also an IAP 100 in an earlier IAC 300 that is not the final IAP 100 in that IAC 300.

As an illustration of both of these, consider the following set up in which an AS 450 contains IAC 1, IAC 2 and IAC 3 below. The link is from the first IAP 100 of IAC 3 to the middle IAP 100 of IAC 1:

Note that in the embodiments illustrated in the figures, the mapping of the control system (IAx) to the presentation system (ASx) would mean an IAS would have a directly corresponding AS and the IACs set out below would be implemented as S-IACs in this IAS and would be ASIs in that AS. Both IAx and ASx data structures would be maintained and would be in step with each other.

In other words: the AS 450 would contain ASIs 430 and these directly correspond to an IAS 400 and its constituent S-IACs 410 respectively.

IAC 1 (collect TEXT/IMAGE and IMAGE; send to NOTE and QRCODE):

| ID | AD | Link |
|---|---|---|
| (TEXT D)1/out/text | --> | (NOTES D)1/in/body rich text |
| (IMAGE D)1/out/image | --> | (NOTES D)1/in/body rich text [L1] |
| (IMAGE D)2/out/image | --> | (QRCODE D)1/in/image |

IAC 2 (collect TEXT; send to MESSAGE):

| ID | AD | Link |
|---|---|---|
| (TEXT D)2/out/text | --> | (MESSAGE D)1/in/body rich text |

IAC 3 (collect NOTE; send to MAIL):

| ID | AD | Link |
|---|---|---|
| [L1] (NOTES D)1/out/note --> | (MAIL D)1/in/attachment | |

Note that in the above example the link identified as [L1] is an explicit or hard-coded link, e.g. using a dependency attribute of the IAP to form the link. This link can also be implicitly derived by examination of the IACs together and noting that the instance of the Notes Device in IAC 3 is the same as the instance of the Notes Device in IAP 1. In the embodiments illustrated in the figures, this is apparent by comparing the sequenced ID and AD instance attributes. There is then also an implicit link between the first IAP of IAC 1 and the IAP of IAC 3 which is not explicit or hard coded in the above example.

It will be appreciated that the link could be only between IACs 300 (in this case creating a dependency of IAC 3 on IAC 1). However, in this example, the links are between IAPs 100, i.e. finer resolution than IACs 300. This provides finer control and better resiliency. For example, if the link were between IACs 300 and the QRCODE IAP 100 in IAC 1 failed to execute, then IAC 1 would report an error and the link would fail. However, with IAP linking, providing the IMAGE→NOTES IAP executed successfully, even if the QRCODE IAP failed, the link can be made and IAC 3 can proceed to execute.

It is also possible for a linked output to drive more than one subsequent IAP inputs. For example the following AS 450 contains IAC 1, IAC 2 and IAC 3 with an IAP 100 in IAC 1 linked to two IAPs 100 in IAC 2 as well as one IAP 100 in IAC 3:

IAC 1 (collect TEXT and IMAGE; send to NOTE):

| ID | AD | Link |
|---|---|---|
| (TEXT D)1/out/text --> | (NOTES D)1/in/body rich text | |
| (IMAGE D)1/out/image --> | (NOTES D)1/in/body rich text | [L1] |

IAC 2 (collect NOTE; send to MAIL/MESSAGE):

| ID | AD | Link |
|---|---|---|
| [L1] (NOTES D)1/out/note --> | (MAIL D)1/in/attachment | |
| [L1] (NOTES D)1/out/note --> | (MESSAGE D)1/in/attachment | |

IAC 3 (collect NOTE; send to CLOUD):

| ID | AD | Link |
|---|---|---|
| [L1] (NOTES D)1/out/note --> | (CLOUD D)1/in/attachment | |

As with the previous example, the links indicated by [L1] above may be either implicitly determined by examination of the IACs and device instance identifiers as a whole or they may be explicitly set, e.g. using dependency attributes.

In fact, it can be said that an implicit link provides for (i.e. defines) a dependency to some extent. However, whether or not that dependency is used or enforced is a matter of the implementation of the device and its interfaces. An explicit link mandates a dependency.

Thirdly, considering decisions within IAC sequences (IASs) 400, the general mechanism for providing decisions is to introduce a Decision Device which executes some internal logic based on its inputs and its Decision Criteria 115 and creates an explicit link (a Decision Result 415—see below) which is dependent on the outcome of the logic. By selecting which link to create, the Decision Device can alter the progression of the sequence. In the following example (illustrated in FIG. 5), text is collected from Text Device 501 and sent to a first Notes Device 502. An image is collected from Image Device 503 and sent to a second Notes Device 504. Once both notes have been created (note that both dependencies L1 and L2 must be fulfilled), they are sent to a Decision Device 506. Once the Decision Device 506 has received both inputs it executes its internal logic in combination with its Decision Criteria 115 and creates either explicit link EL3 or explicit link EL4 as the Decision Result. As the Decision Device 506 will only create one of EL3 and EL4, this forms a branch in the processing. If EL3 is created, an integrated Note (i.e. a combination of the first note and second note) is sent by email via Mail Device 507. If EL4 is created, the integrated Note is sent by a Messaging service (e.g. SMS or MMS) via Message Device 508.

The IAS contains IAC 1 (510), IAC 2 (512), IAC 3 (513) and IAC 4 (514) below. These are indicated in FIG. 5 using broken lines around the Devices that they contain:

IAC 1 (collect TEXT and IMAGE; send to NOTE):

| ID | AD | Link |
|---|---|---|
| (TEXT D)1/out/text --> | (NOTES D)1/in/body rich text | [L1] |
| (IMAGE D)1/out/image --> | (NOTES D)2/in/body rich text | [L2] |

IAC 2 (collect NOTE; send to same DECISION instance):

| ID | AD | Link |
|---|---|---|
| [L1] (NOTES D)1/out/note --> | (DECISION D)1/in/attachment | [EL3 or EL4] |
| [L2] (NOTES D)2/out/note --> | (DECISION D)1/in/attachment | [EL3 or EL4] |

IAC 3 (collect NOTE; send to MAIL/MESSAGE)

| ID | AD | Link |
|---|---|---|
| [EL3] (DECISION D)1/out/note --> | (MAIL D)1/in/attachment | |

IAC 4 (collect NOTE; send to MAIL/MESSAGE)

| ID | AD | Link |
|---|---|---|
| [EL4] (DECISION D)1/out/note --> | (MESSAGE D)1/in/attachment | |

In the above example, the Decision Device creates an output from its input. Its output is used for the next stage. Hence in each of IAC 3 and IAC 4, (DECISION D)1 is used as the input to feed into the MAIL or MESSAGE Device. However, it will be appreciated that IAC 3 and IAC 4 could equally well use other inputs. For example, in IAC 3, (DECISION D)1/out/note could be replaced with (NOTES D)1/out/note and in IAC 4, (DECISION D)1/out/note could be replaced with (NOTES D)2/out/note. With this arrangement, the Decision Device would either cause Note 1 (comprising the Text input) to be sent by Mail, or it would cause Note 2 (comprising the Image input) to be sent by Message. For example, the Decision Criteria 115 may stipulate that if the text element is less than a certain number of characters, the Messaging service is used, otherwise the Mail service is used.

In addition, because IAC3 and IAC4 can equally well use other inputs, then the inputs used for IAC3 or IAC4 could represent some transformation of the inputs received at the (DECISION D) 1. In the case where (DECISION D) 1 was acting as the input for IAC3 and IAC4 it could also make a similar transformation. In the above example it can be seen that the decision device (DECISION D)1 has transformed two separate notes inputs into a single integrated notes output, although conceivably any alternative output could have been provided based on the decision device inputs, its internal logic and its decisionCriteria attribute 115.

FIG. 4 illustrates the extension of the IAP and IAC data model to encompass IASs. The IAPs 100, Devices 110, Media Interfaces 120, Media Types 130 and IACs 300 are the same as in FIGS. 1 and 3. IASs 400 are added in this model, each IAS 400 having a name 402 and a unique identifier 401 and relationships 403 to one or more IACs 300 (or S-IACs—see below). The relationship between IASs 400 S-IACs is a one-to-many relationship as a single IAS 400 can include many S-IACs, but an S-IAC can only belong to one IAS 400.

Again, the relationship between an IAS 400 and an IAC 300 could be a direct relationship to an IAC data entity 300. However, a further data entity is illustrated in FIG. 4, being essentially a child of IAC 300, called an S-IAC 410 (or Sequenced IAC). The reason for introducing an S-IAC 410 is that once an IAC 300 has been created, it may be desirable to use it several times in different IASs 400 defined by the user. Within an IAS 400, there may be a need to add other attributes to an IAC 300 such as its sequence position within the IAS 400 (e.g. to determine the order in which the IACs 300 should be presented to the user for execution) or a Decision Result 415 that identifies that the IAC is the start of a processing branch within the IAS 400 (execution of the branch being a potential outcome from a Decision Device in earlier processing). These will likely be different for different IASs 400 and therefore each IAS 400 needs to retain its own information relating to the IAC 300. As with IAPs 100 and C-IAPs 310 above, one way to do this is via a parent/child relationship with inheritance. The parent IAC 300 (with the basic attributes discussed above) is created first. When an IAS 400 is created, an S-IAC 410 is created as a child of each relevant IAC 300, inheriting all properties (attributes and relationships) of the parent IAC 300 and with the additional attributes necessary for defining the IAS, in this case the decisionResult 415 if appropriate and the relationships NextSIAC 411 and PreviousSIAC 412. The S-IACs 410 also have relationships 413 to the associated IAS 400. In such cases, it is also necessary for the child object to inherit the values (not just the structure) of the parent object, or to be assigned those values on creation. However, with this arrangement changes to the values of the parent will not automatically propagate to its children. Therefore, instead of using inheritance, it is preferred that the child object (the S-IAC) contains a relationship to its parent object (the IAC), e.g. an attribute that points or links to the parent object. The values of the parent object are thus accessed directly from all of its children, avoiding the value propagation issue described above.

It should be noted that a Decision Result 415 could be linked to more than one S-IAC and thus can link to a plurality of processing branches to be executed in parallel.

Additionally, as described above in relation to IACs 300, an S-IAC 410 will also need its own copies of (or relationships to) the relevant IAPs 100 and therefore when an S-IAC 410 is created, SC-IAPs 420 are created, having a child relationship 421 to the C-IAPs 310 which in turn have a child relationship 316 to the base IAPs 100. This allows additional attributes to be added to the SC-IAPs 420 for control and management of the IASs 400. The S-IACs 410 also have relationships 414 to the associated SC-IAPs 420.

The sequenced ID instance attribute 422 and the sequenced AD instance attribute 423 of the SC-IAP 420 are used in the same way as the combined ID instance attribute 313 and combined AD instance attribute 314 described above. Note that these attributes 422, 423 can span different IACs 300. This allows I/O linking to occur between IAPs 100 in one IAC 300 and IAPs 100 in a later IAC 300 in the overall IAS 400. In some cases the IACs 300 can also span different IASs 400 within a single software instance. It should be appreciated that in a sequence, a Device may act as an AD in one step and an ID in a subsequent step. Thus different SC-IAPs 420 may refer to the same device instance using either the sequenced ID instance attribute 422 or the sequenced AD instance attribute 423 depending on whether the Device is acting as an ID or an AD for that SC-IAP 420.

Sequencing in this embodiment is implemented using the relationships nextSIAC 411 and previousSIAC 412 of the S-IACs 410. These relationships indicate which Sequenced IAC 310 (S-IAC) is the next step in the sequence and also the step which referred to the current step. An illustration of a straightforward SIAC chain is shown in FIG. 6.

It should be noted that in some embodiments, Decision Devices as discussed above could be implemented by allowing the Decision Device to directly alter the nextSIAC relationship 411 of an S-IAC within which it appears thereby affecting the progression of the sequence. However, it is preferred that the Decision Device does not have knowledge of, or access to, the structures in which it is contained. This is particularly the case where third party devices may be provided which can preferably interact with existing structures. Therefore, in this embodiment, the Decision Device alters the progression of a sequence by generating a decision result (a special output of the Decision Device) which matches the decisionResult 415 attribute of the S-IAC that the processing will branch to and continue from. The S-IAC nextSIAC 411 relationship is then one-to-many in order that several nextSIAC decision outcomes can be supported.

In addition, whilst in this embodiment a decision result references an S-IAC 410, in other embodiments the derived decision result could reference an SC-IAP 420 should a finer resolution of branching be needed. In which case branching occurs to a particular SC-IAP within an S-IAC from where processing continues.

FIG. 4 also illustrates a further data item, the Action Stack Item (ASI) 430. The ASI 430 is essentially a container that can contain one IAS 400, one IAC 300 or one IAP 100. It acts as a single unified data structure to represent a workflow. The ASI 430 has a unique ID 431 and may have a relationship 432 to an IAP, a relationship 433 to an IAC 300 or a relationship 434 to an IAS 400.

Also shown in FIG. 4 is the more general structure of an Action Stack (AS) 450 which can encompass one or more ASIs 430. An AS 450 can also contain other ASs 450 to provide a nested structure in which users can group and manage their workflows. Accordingly, the AS 450 has a one-to-many relationship with ASIs 430 and with other ASs 450. In the embodiment shown here, the way that nesting of ASs 450 has been implemented is by allowing an ASI 430 (contained within an AS 450) to contain a relationship to another AS 450 (the nested AS) instead of referencing an IAP, IAC or IAS (or as well as referencing an IAS where that IAS uses an AS 450 to display its associated S-IACs 410 as ASIs 430).

It should be noted that when working with only a single IAP 100, then the ASI 430 can be linked to just the single IAP 100. Similarly, when working with a combination of IAPs 100 (i.e. an IAC 300), then the ASI 430 can be linked to the IAC 300 and the IAC 300 is in turn linked to the constituent C-IAPs 310 (which inherit from or link to the basic IAPs 100). Likewise, when working with an IAC sequence (i.e. an IAS) 400, then the ASI 430 can be linked to the IAS 400, the IAS 400 is linked to the constituent S-IACs 410 (which inherit from or link to basic IACs 300) and the S-IACs 410 are in turn linked to the sequenced combined IAPs (SC-IAPs) 420 (which inherit from or link to the C-IAPs 310 and so also the IAPs 100). Here the ASI 430 can be additionally linked to an AS 450 should the IAS 400 use an AS and associated ASIs to display its constituent S-IACs.

Therefore for any scenario, it is only necessary to work with a maximum of 3 data entities—an IAS entity, IAC child/parent entities and IAP child/parent entities. These are illustrated in FIG. 4 with dashed lines 461, 462 and 463 respectively.

For simple cases, as described above, only a single IAC 300, or indeed only a single IAP 100 may be required in the workflow. In such situations there is no need to create or use the larger data entities (IACs 300 and IASs 400). However, in practice, in some embodiments, to help keep the code singular and maintainable it is assumed that all scenarios involve sequences and combinations. Thus a single IAP 100 may be part of an IAC 300 even though there are no other IAPs 100 in the combination and that IAC 300 may be the only IAC 300 in an IAS 400 with a sequence length of 1. As is illustrated in FIG. 4, the IAS 400 is shown with a relationship 404 to the corresponding ASI 430. For the more general case, IACs 300 and/or IAPs 100 also have relationships 305 and 108 respectively to an ASI 430.

Each of the data entities IAPs 100, IACs 300, IASs 400, C-IAPs 310, S-IACs 110 and SC-IAPs 420 are in effect a class or template. The objects required to implement a given user's stored workflows and any pre-configured workflows are stored as data entries in a database until such time as a workflow is initiated by a user. When a workflow is initiated, appropriate programmatic objects and/or functions are created to implement the required workflow, including the required Devices and their interfaces to gather the various required inputs and to generate the required outputs.

A further feature of the system which is illustrated in FIG. 4 is the use of preset inputs which can be stored in the data entity 470. This can be used to provide default inputs to an IAP 100 (actually C-IAP 310 in this embodiment). These can be over-ridden during use, but they provide an initial input for an IAP which may be used frequently with the same value. For example a workflow may involve sending an email to a particular email address. It would be inefficient to enter the email address every time the workflow was activated. Therefore the email address can be set as a preset value associated with the Contact→Mail IAP. Each preset input 470 has a unique ID 471, a name 472, a preset input type 475 (examples of which are: contact, text, image and so on), either a preset input value 473 or a preset input location 476 (a location may be used instead of a value where, for reasons of practicality, the preset input is located outside of the data model and is accessed instead using a reference such as a universal resource locator character string) and a relationship 474 to the C-IAPs in which it is used.

The previous examples illustrate the mechanics of certain implementations, but particular applied use cases are also useful to demonstrate the significant efficiency improvements that can be achieved with this system.

As an example consider the case of a user (for example a social media manager in company) who as part of their work routine performs the following tasks from a smart device on a regular basis: (a) post the same update to two social network sites (for example Facebook and Twitter) and then (b) send an email with the social network post and some additional text to inform colleagues that the update has been posted.

With present arrangements on one particular device the user must:
navigate to Facebook app
launch Facebook
locate status update button (towards the upper left on the UI)
select 'Status'
type in message
copy text (note that this must be done before posting for best efficiency)
select the 'post' button
navigate away from the Facebook app (e.g. press the home button)
navigate to Twitter app
launch the Twitter app
locate post update button (which is different from Facebook: the update button has a symbol not a word, and is located in the upper right on the UI)
select symbol for post
long press text field
select 'paste'
select tweet
navigate away from the Twitter app (e.g. press the home button)
navigate to mail app
launch the mail app
locate button for compose (uses symbol but different in nature to Facebook; located in lower right on UI)
select compose
complete "to:" field
complete "subject" field
add text, e.g.: 'colleagues—the following social media update has been posted'
paste status update text in body text field
select send With an embodiment of the invention as described above (which is referred to here as the "FloFrame app"), the steps are as follows:
navigate to FloFrame app
launch FloFrame app
navigate to 'daily social update' (optional step—based on regular usage the system can learn and auto-present this ASI upon launch)
select 'daily social update' ASI
complete Text 1 ID: [insert social media update text]
complete Text 2 ID: [mail additional text]
select submit (note that the Facebook and Twitter updates can be performed without confirmation)
confirm Mail update The use of the FloFrame app does involve an ASI configuration procedure but once defined it can be reused (as well as edited, adjusted, dynamically augmented with other tasks etc.)—and the number of steps to produce the routine are not dissimilar to the 'present arrangements' count above (although it could in many cases still be fewer)—i.e. with the FloFrame app a user can substitute steps originally intended to perform a task long-hand to instead create a workflow that can be used, reused, edited, augmented, on an ongoing basis. In fact a user may increasingly begin to think in terms of and begin to approach a task or tasks at hand via quick workflow assembly and execution, even in cases where those tasks are only to be executed on a single occasion.

As further illustration, adding work items to the existing arrangements can quickly compound already difficult usability. For example, in a more complex workflow where two or more separate pieces of text were to be shared between two applications, with existing arrangements copying and pasting would require repeated navigation back and forth between apps, greatly adding to the number of steps required. By use of the FloFrame app, sharing several text items between several target action functions is straightforward and in fact can be achieved via a simple rearrangement of the app's already defined work flow.

As a further example, consider again the case of a flooring company representative visiting a customer location and preparing a quote for provision of replacement flooring. In this case as part of their quotation process they perform the following tasks from a smart device in a specific sequence:

(a) capture introductory text and use this to create note (b) capture image of room and annotate this with measurements made (c) send this image to (i) an online service that matches flooring products from images, (ii) a local supplier via email to request an offline check for similar products (d) place call to local supplier to follow-up on emailed image; record audio (e) perform text-to-speech conversion on audio, generating transcript (f) email all materials (note, online match results, local supplier call audio, local supplier call transcript) back to the office (g) send notification of transaction back to designated individual in the office to alert to need for further processing (if message<=720 characters send via message if >720 characters send via mail)

These are shown implemented as an IAS 400 containing S-IACs 410 as follows:

S-IAC 1: capture introductory text and use this to create note. The number of user steps is 1 (enter text)

| ID | AD | Link |
|---|---|---|
| (TEXT D)1/out/text --> | (NOTES D)1/in/body rich text | L1 |

S-IAC 2: capture image of room and annotate this with measurements made. Note that the first C-IAP in this S-IAC would have an AD priority set higher than the second C-IAP, to ensure that it executed first and that Link L2 was successfully made. The number of user steps is 2 (capture image, annotate image)

| ID | AD | Link |
|---|---|---|
| (IMAGE D)1/out/image --> | (IMAGE PROCESSING D)1/in/image | L2 |
| L2 (IMAGE PROCESSING D)1/out/image --> | (NOTES D)1/in/body rich text | L1 |

S-IAC 3: send this image to (i) an online service that matches flooring products from images, (ii) a local supplier via email to request an offline check for similar products. Only 1 user step (to confirm mail sending) is required in this S-IAC

| ID | AD | Link |
|---|---|---|
| (IMAGE D)1/out/image --> | (WEB SERVICE D)1/in/image | L3 |
| (IMAGE D)1/out/image --> | (MAIL D)1/in/image | |
| (TEXT D) 2/out/text (preset) | (MAIL D)1/in/subject text | |
| (TEXT D) 3/out/text (preset) | (MAIL D)1/in/body text | |

S-IAC 4: place call to local supplier to follow-up on emailed image and record audio perform text-to-speech conversion on audio, generating transcript. No user steps are required in this S-IAC (although a step could be offered to allow place of call at convenient moment)

| ID | AD | Link |
|---|---|---|
| (AUDIO D)1/out/audio --> | (CALL D)1/in/audio | L4 |
| L4 (CALL D)1/out/audio --> | (TEXT-TO-SPEECH D)1/in/audio | L5 |

S-IAC 5: email all materials (note, online match results, local supplier call audio, local supplier call transcript) back to the office. Only one user step is required (to confirm e-mail sending) in this S-IAC.

| ID | AD | Link |
|---|---|---|
| (TEXT D)3/out/text (preset) | --> (MAIL D)1/in/subject text) | |
| L1 (NOTE D)1/out/rich text | --> (MAIL D)1/in/body text) | |
| L3 (WEB SERVICE D)1/out/html file | (MAIL D)1/in/attachment #1) | |
| L4 (CALL D)1/out/audio | (MAIL D)1/in/attachment #2) | |
| L5 (TEXT-TO-SPEECH D)1 out/text file | (MAIL D)1/in/attachment #3) | |

SIAC 6: send notification of transaction back to designated individual in the office to alert to need for further processing. No user steps required in this S-IAC but one user step will be required in one of the following S-IACs to confirm either mail or message sending

| ID | AD | Link |
|---|---|---|
| L1 (NOTE D)1/out/rich text --> | (DECISION D)1/in/rich text | DR1 or DR2 |

S-IAC 7: (if message<=720 characters send via message)

| ID  | AD                       | Link              |
|-----|--------------------------|-------------------|
| DR1 | (DECISION D)1/out/text --> | (MESSAGE D)1/in/text |

S-IAC 8: (if message>720 characters send via mail)

| ID  | AD                       | Link              |
|-----|--------------------------|-------------------|
| DR2 | (DECISION D)1/out/text --> | (MAIL D)2/in/subject text |

Very specific workflows are thus able to be modelled and generated quickly via device pairing, combining and sequencing functionality as provided by the FloFrame app. The arrangement shown involves only six user steps (it is assumed that the IAS 400 is set to auto-proceed from an S-IAC to a next S-IAC). Seeking to use present arrangements to achieve the same end result would involve a very large number of additional steps and in addition, aspects of the arrangement may in fact not be readily achievable.

As another example of how the system may be used, consider the case of a restaurant owner seeking to automate management of his restaurant business. The restaurant owner determines that his target arrangement is as follows:
  provide waiting staff with smart devices so that table orders can be taken and transferred to the kitchen.
  smart devices to reflect stock status so that waiting staff do not offer items that are out of stock.
  smart devices host reference materials (detailed menus, wine charts, food/wine pairing notes) so that the waiting staff have this information to hand.
  table availability can be checked and table bookings can be taken.
  in the event of an urgent situation, for example in relation to an unhappy customer, an audio message can be transferred from the waiting staff to the kitchen.
  use of social media channels that can be updated with news or special deals at short notice (for example if trade is slow on a particular lunchtime a two for one deal could be broadcast).
  restaurant directions and map and the means to convey these to customers via the most appropriate channel for the customer (e.g. email or phone multimedia message).
  a means to close the tab (or order) and create a bill for the customer.

In a traditional app-centric environment, the restaurant owner would have to assemble a collection of discrete apps that do not function in an integrated way and where many steps including app switching and context switching are required to achieve the above arrangement. Alternatively he could purchase an existing app to assist in restaurant management, but this may be expensive and also may not provide all of the desired features—e.g. audio message to kitchen, storage of reference materials for waiting staff or updating of social channels. Finally he could request a custom app be written but this would be very expensive with further cost and time-delays incurred if future new features are required to be added.

Using the system that has been described above, the detailed IACs used in this restaurant management example could be as follows (it will be appreciated that only a limited number of options has been provided in each specific area for brevity):

AS:Restaurant Management/Sub-AS: Drinks Orders/Sub-AS: Soft Drinks

IAC1 (auto run=yes), ASI name: Orange Juice 330 ml

| ID | AD |
|---|---|
| TEXT D #1/out/text (preset: Drinks Order) | --> NOTES D #1/in/title text |
| TEXT D #2/out/text (preset: Orange Juice 330 ml) | --> NOTES D #1/in/body text |

IAC2 (auto run=yes), ASI name: Pineapple Juice 500 ml

| ID | AD |
|---|---|
| TEXT D #1/out/text (preset: Drinks Order) | --> NOTES D #1/in/title text |
| TEXT D #2/out/text (preset: Pineapple Juice 500 ml) | --> NOTES D #1/in/body text |

AS:Restaurant Management/Sub-AS: Food Orders/Sub-AS: Pizzas

IAC3 (auto run=yes), ASI name: Margarita Pizza

| ID | AD |
|---|---|
| TEXT D #1 / out / text (preset:Food Order) | --> NOTES D #1 / in / title text |
| TEXT D #2 / out / text (preset:Margherita Pizza) | --> NOTES D #1 / in / body text |

AS:Restaurant Management/Sub-AS: Drinks Orders/Sub-AS: Pastas

IAC4 (auto run=yes), ASI name: Lasagna

| ID | AD |
|---|---|
| TEXT D #1 / out / text (preset:Food Order) | --> NOTES D #1 / in / title text |
| TEXT D #2 / out / text (preset:Lasagne) | --> NOTES D #1 / in / body text |

AS:Restaurant Management

IAC4 (auto run=yes), ASI name: Food/Wine Pairing Chart

| ID | AD |
|---|---|
| IMAGE D #1 / out / image (preset:food/wine pairing chart) | --> IMAGE D #1 / in / image |

IAC5 (auto run=yes), ASI name: Wine Guide

| ID | AD |
|---|---|
| IMAGE D #1 / out / image (preset:wine guide) | --> IMAGE D #1 / in / image |

IAC6 (auto run=yes), ASI name: Detailed Menu

| ID | AD |
|---|---|
| IMAGE D #1 / out / image (preset:detailed menu) | --> IMAGE D#1 / in / image |

IAC7 (auto run=no), ASI name: Table Availability

| ID | AD |
|---|---|
| CALENDAR D #1 / out / event | --> DUMMY D #1 / in / text |

By connecting to a 'dummy AD', the ID is effectively launched standalone, so in this case the calendar may be browsed in a standalone way. It is possible to 'roll' the ID to a new AD should this be desired (as an illustration of this, see the working for IACs 11 and 12 below).

IAC8 (auto run=no), ASI name: Book Table

| ID | AD |
|---|---|
| TEXT D #1 / out / text | --> CALENDAR D #1 / in / event |

IAC9 (auto run=no), ASI name: Urgent Voice Request

| ID | AD |
|---|---|
| AUDIO D #1 / out /audio | --> NOTES D #1 / in / audio |
| TEXT D #1 / out / text (preset:URGENT CUSTOMER-RELATED MESSAGE) | --> NOTES D #1 / in / title text |

IAC10 (auto run=no), ASI name: Update Social Channels

| ID | AD |
|---|---|
| TEXT D #1 / out / text | --> TWITTER D #1 / in / text |
| IMAGE D #1 / out / image | --> TWITTER D #1 / in / image |
| TEXT D #1 / out / text | --> FACEBOOK D #1 / in / text |
| IMAGE D #1 / out / image | --> FACEBOOK D #1 / in / image |

AS:Restaurant Management/Sub-AS: Send Directions
IAC11 (auto run=no), ASI name: Restaurant Address

| ID | AD |
|---|---|
| TEXT D #1 / out / text (preset: address) | --> TEXT D #1 / in / text |

Note: this IAC is launched and the ID presents, the actual target AD is then selected via use of roll mode working, which is where the ID and its contents are maintained and a new AD is connected (so a new IAC/IAP is automatically built)—if the customer requires the directions via message then new IAP/IAC is setup with a Message AD, if the customer requires the directions via email then the new IAP/IAC is setup with a Mail AD. It is of course possible to optimise programming the original IAC with one of these ADs as default (the one most likely to be used) and the user would only need to 'roll' to the other AD in the event the customer wanted that specific channel to be used.

IAC12 (auto run=no), ASI name: Restaurant Map

| ID | AD |
|---|---|
| IMAGE D #1 / out / image (preset: map image) | --> IMAGE D #1 / in / image |

Note: the IAC is launched and the ID presents, the actual target AD is then selected via use of roll mode working, which is where the ID and its contents are maintained and a new AD connected (so a new IAC/IAP is automatically built)—if the customer requires the map via message then new IAP/IAC is setup with a Message AD, if the customer requires the map via email then the new IAP/IAC is setup with a Mail AD. It is of course possible to optimise programming the original IAC with one of these ADs as default (the one most likely to be used) and the user would only need to 'roll' to the other AD in the event the customer wanted that specific channel to be used.

IAC13 (auto run=yes), ASI name: Close Tab

| ID | AD |
|---|---|
| NOTES D #1 / out / all fields (document format) | --> WEB D #1 / in / document viewer |
| NOTES D #1 / out / all fields | --> MAIL D #1 / in / body text |
| TEXT D # 1 / out / text (preset: 'Your Statement From xxxxx Restaurant') | --> MAIL D #1 / in/ title text |

With this IAC, as well as the statement being made available on the waiting staff smart device a copy can be emailed to the customer on request and a hard copy created via a connection. A hard copy may also be generated by (a) directing to a print function within the WEB D; (b) adding an IAP to connect NOTES D #1/out/all fields (document format)→PRINTER D/in/document in; or (c) the Notes D information, whose data is cloud-synchronised, being accessed from the cloud and the statement information directed to a printing device.

The Notes D may contain, e.g. 6 data repositories (notes folders) which represent restaurant tables against which orders can be placed, i.e. Table 1, Table 2. Table 3, Table 4, Table 5, Table 6.

The contents of the notes folders are then food/drinks orders that have been assigned to the specific tables by use of IACs 1-4 above (and this will have been done on a repeat basis if more than one item of the same type is assigned to a table, e.g. 2 orange juices).

As yet another example of the use of the system described above, consider the case of a newspaper journalist seeking to automate research, capture and synchronisation of interviews with politicians (audio and images). The journalist determines that his target arrangement is as follows:

- calendar check, booking and issuing of invite to interviewee.
- research and collate material on the interviewee from the Wikipedia reference web site.
- research and collate material on the interviewee from internet news sites.
- research and collate material on the interviewee from the general internet.
- access a to-hand repository with editorial guidelines for the different organisations he freelances for.
- the interview will take place at a specific location, the journalist researches/determines the location, stores this, sends it to the interviewee also sets the interview workflow to launch automatically when the location is arrived at.

create a note with the prepared interview questions, based on researched/collated material.

means to take interviewee photographs that will sync immediately to the office for web and print use.

means to record audio interview that will sync immediately to the office for transcribing and web and print use.

update social channels with 'teaser' information (images and quotes) from the interview.

The options for the journalist are similar to those of the restaurant owner in the previous example. Compared to the traditional app-centric environment options for implementation of this workflow, with this system the journalist can achieve exact, customised functionality at minimum effort & cost, operating with a minimum of steps, and with the ability to continually develop & customise the functionality in-line with their requirements.

In some implementations, an action stack (AS) has an associated database where media items generated in the course of use of the AS can be stored. The database can be accessed by creating an input action pair (IAP) that includes a Notes Device as the action device (AD). Data written to this notes device/database can also be synchronised with a cloud service of the user's choice.

A typical IAC construct for passing information to a Notes D would be:

IAC (autorun=yes)

| ID | AD |
|---|---|
| TEXT D #1 / out / text (preset:Drinks Order) | --> NOTES D #1 / in / titleText |
| TEXT D #2 / out / text (preset:Orange Juice 330ml) | --> NOTES D #1 / in / bodyText |

Data stored in the database can be used as an input in the system by using a Notes Device as an input device (ID) in an input action pair.

In practice a Notes D is widely used as part of many workflows, providing a repository for data either as a general storage folder facility, or where the folder is purposed as a specific kind of data object, for example:

in a restaurant management usage: notes repository folders could represent Tables in the restaurant, and hold drinks or food order placed against those tables.

in a school report usage: notes repository folders could represent pupils in the class and hold text notes and images related to an individual pupil's activities and progress.

in an interview usage: notes repository folders could provide a container for grouped media related to a specific interview.

Because the notes repositories are able to be cloud-synchronised, enhanced process working is facilitated. For example, other parties (e.g. co-workers) are able to immediately process information generated (e.g. prepare a quote or transcribe and web-upload interview) or other cloud side integration (e.g. automated process integration—such as updating of restaurant stock levels) can be effected.

It can be seen from the above that IACs may have the ability to be set to auto-run. With this setting, on initial ASI selection the ID interfaces (which, for the auto-run case normally all contain preset values) are immediately switched to the AD interfaces.

This working is particularly useful where presets are used at all the ID interfaces; e.g. where stock items are being added to a Notes D repository, but in other cases also: e.g. web addresses being sent to a Web D, or preset text being sent to a Message D, etc.

In cases where not all presets are set, auto run would not normally be used—e.g. with reference to the drinks order above, if the specific drink were to be manually entered at the point of ordering this would be better arranged as:

IAC (autorun=no)

| ID | AD |
|---|---|
| TEXT D #1 / out / text (preset:Drinks Order) | --> NOTES D #1 / in / titleText |
| TEXT D #2 / out / text (preset:[none]) | --> NOTES D #1 / in / bodyText |

The system is also able to facilitate an arrangement whereby input-action associations, combinations and sequences are automatically created based on machine intelligent logic. For example the current device the user is working with and the next device that the user indicates they wish to work with can form the basis for a decision on what input action associations, combinations and sequences can be optimally used to transfer information between the devices. In effect the current device is acting as an ID and the next device as an AD, and the system determines how these are optimally connected given the overall context.

Using this method a user is able to 'roll' forwards (and backwards) quickly between devices, transferring information from device to device in an optimal and advantageous way, thus avoiding unnecessary re-entering of information and facilitating transfer of additional relevant information generated by devices in the course of their operation.

An example of this is a Location D where much location information (street address, postcode, geo-coordinates, etc.) can be generated by the Location D, whereas the user's entered input was much more high level, e.g. a city name and then some zoom-in gestures. This extra data can then be connected on ('rolled on') in this case to other devices.

The user interface and control logic which is used to create and operate workflows will now be discussed with reference to FIG. 7.

The User Interface (UI) has three top-level components which all form part of the main presentation screen to the user: 1) Utility Pane (UP), 2) Grid Pane (GP) and 3) Model Overlay (MO). An example screenshot 700 is shown in FIG. 7 showing the Utility Pane 710 and Grid Pane 720. The Model Overlay Pane will be described later and is shown in FIG. 8.

The Utility Pane 710 displays IAPs 100 and is where the Input Device input interfaces will allow the user to enter inputs, e.g. entering text, controlling a camera of the smart device to take a picture or video, selecting a picture or video from a library of stored pictures/videos on the smart device, controlling audio capture from a microphone of the smart device or selecting a pre-stored audio clip from a library on the smart device, controlling a location service of the smart device such as GPS to obtain location information, capturing other sensor information such as accelerometers, temperature sensors, pressure sensors, etc. It will be appreciated that in some cases, Input Devices may present to the user "modally", i.e. full screen, rather than being restricted to the Utility Pane 710. This may be the case for example for a camera Input Device where it is advantageous to use the maximum screen size of the device for composing the picture/video.

The Grid Pane 720 displays the various workflows or parts thereof which the user can select for operation. The Grid Pane 720 displays the contents of an Action Stack (AS) 450 which, as described above, may contain Action Stack Items (ASIs) 430 or further nested Action Stacks 450. An ASI 430 may contain a single Input Action Pair (IAP) 100, an Input Action Combination (IAC) 300 comprising one or more IAPs 100 or it may contain a group of IACs 300 which may be sequenced (IAS 400) or unsequenced, with the possibility of various items of the group having dependencies. or representing branches of an overall sequence.

Figure 7:
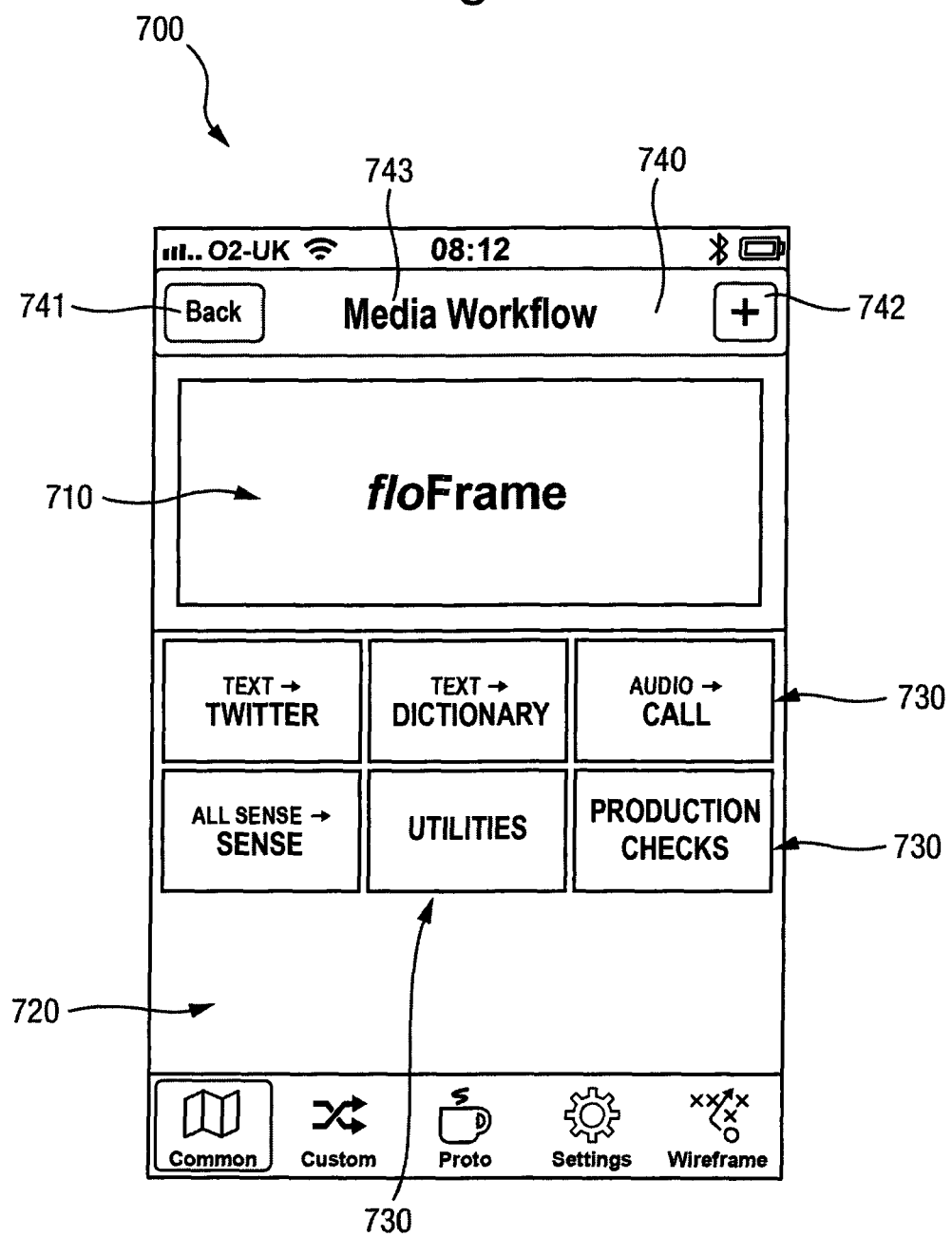
FIG. 7 shows an example screenshot of one embodiment of the system.

In FIG. 7, there are six buttons 730 (for six ASIs 430) in the Grid Pane 720. Four of these are simple IACs, these being "TEXT→TWITTER", "TEXT→DICTIONARY", "AUDIO→CALL" and "ALL SENSE→SENSE". The other two ASIs 430 are groups of IACs 300. The "UTILITIES" ASI 430 is an unsequenced group 400 of IACs, and the "PRODUCTION CHECKS" ASI 430 is a sequenced group (IAS) 400 of IACs 300. A sequenced group which leads the user through various steps is also termed a flow in this document.

The display of the ASIs 430 of an AS 450 within the Grid Pane 720 may be based on a custom, prescribed arrangement (e.g. set by the user or set as a default) or it may be automatically determined by analysis of the contents of the AS 450, e.g. according to dependencies or sequence positions of an IAS 400. The display may also be automatically determined or adjusted based on context factors, environmental factors or learning factors. For example, based on time of day, sensed motion, similar sequences of tasks performed before or tasks performed at the same time of day.

A control bar 740 above the UP 710 and GP 720 provides control button 741, 742 and other relevant information e.g. the name 743 of the current Action Stack 450.

The Modal Overlay component of the UI can be used for displaying outputs of the Action Devices (as well as for obtaining inputs from some Input Devices) or for obtaining further information and/or confirmation from the user during processing of the Action Devices. The content of the Modal Overlay component may be partly provided by other software, e.g. other Operating System components or other applications that can be called by the present system for execution of certain tasks, e.g. Mail Apps, Dictionary Apps, Note Apps, etc.

When an IAC 300 is initiated (usually by selecting it, e.g. by a touch on the relevant ASI button 730 in the grid pane 720 on a touchscreen of the smart device), the database is consulted and the various IAPs 100 are analysed to determine the Devices 110 (both Input Devices and Action Devices) that need to be created and/or initialized. Any inputs required by the Input Devices need to be acquired, e.g. from the user or from other sources of the smart device. This stage of operation is referred to as "arming" the devices in this document. For example for a text device, the user may be prompted to enter text, or for an image device, the user may be given options to take a photograph or to load a photograph (or other image) from a picture library. During the data input stage, the Utility Pane 710 is used to interact with the user, e.g. presenting a text box for text entry, or control buttons for picture taking/selection or audio input control.

When multiple IAPs 100 are present in an IAC, there may be multiple inputs required from the user, thus the UP 710 may present a stack of inputs for the user to enter. These can be presented initially in an order defined by the ID priority 311 or AD priority 312 attributes of the IAPs (or C-IAPs or SC-IAPs), but can be cycled through by the user according to the user's preferences. Purely as an example, cycling of the IAPs 100 may be achieved by a swiping action on a touchscreen or track pad or by clicking a button or using a pointer device. The ID priority 311 is used to prioritize inputs based on the input device. For example, if the user or the IAC 300 is input focused, it may be preferable to input text before images. This may be the case in a workflow where images are to be taken as evidence of an initial textual description. Alternatively, other workflows may prioritize images over text, e.g. where the timing of image capture is important to capture a transient event, with a text input to add context details being of lower priority. On the other hand, if the user or the workflow is action focused, it may be preferable to enter inputs in an order according to the action devices, e.g. a journalist in the field may wish to prioritize a short twitter update over a more detailed email report back to the office. In this case the AD priority attribute 312 would be used.

In some cases, ID priority 311 and AD priority 312 attributes may be set and the user can select during the arming stage which priority system to use.

In some cases, an AD preview may be provided in the Utility Pane 710, indicating the current status of an AD based on its inputs. For example, this may take the form of a checklist indicating each of the inputs and whether or not the related IDs have captured an appropriate input. This preview may be useful in the case of complex ADs with multiple inputs so that the user can quickly identify which inputs still need to be filled in.

As each input is presented to the user in the UP 710, an indicator also tells the user which IAP 100 is currently requiring input. This is particularly important where multiple inputs of the same type are required within a single IAC 300. For example, in a simple Mail IAC 300, two text inputs may be required, one for the subject text and one for the body text. The user needs to know which is being entered, so the UP 710 displays indicators of both the type of input device (e.g. TEXT device) and the input name of the Action Device input Media Interface, ADiMI 106 (e.g. SUBJECT TEXT). These two identifiers identify both ends of the IAP 100, i.e. both the Input Device Output and the Action Device Input.

The second stage of the ASI operation, after arming all Input Devices is a triggering step. The triggering step delivers the relevant input data to the Action Devices and initiates processing of the inputs and generation of any outputs. The triggering step is typically initiated by the user, e.g. by a second press (selection) of the ASI button 730 in the Grid Pane 720 or by pressing (selecting) a separate "Go" button. This permits editing or re-entering inputs until the user is happy to proceed.

Upon triggering, all of the Action Devices may be fully activated. Processing may be initiated in an order if any order has been set. Multiple Action Devices may be processed in parallel where possible, or they may be processed asynchronously. Processing may proceed without further user interaction unless any of the Action Devices require further user input or user confirmation.

One preferred method of activating the Action Devices is to group IAPs by Action Device. In this mode of operation, all Input Devices required by an Action Device are grouped together and executed together in parallel. The order in which Action Devices are executed may be determined by the AD priority attribute 312 of the C-IAPs or it may be evaluated at execution time based on other factors, e.g. using the canBackgroundProcess attribute 123 of the Media Interfaces 120 to determine which IACs can proceed in the background without further interruption. Other schemes for execution may of course be used.

One preferred method for transferring (or 'switching') information from IDs to ADs is to utilise an intermediate transfer stage based on media type. In this mode of operation, for each IAP in an IAC, the ID output values are collected into a generic data structure with elements based on the media type of the input interfaces. The AD input values for each IAP in the IAC are then set from the values held in the generic data structure.

The benefit of using this arrangement is that the switching logic is independent of the specific devices to be connected and so the interfaces of any ADs or IDs, including devices yet to be devised, can be paired and switched without the switching logic requiring modification, providing those device interfaces have a common media type.

For example, a Mail AD may have an input media interface that receives Body Text and which has a media type of 'rich text'. The Mail AD is capable of being paired with a wide range of IDs that are able to output text into this interface (e.g. a Text ID that outputs user keyboard entered text, or a Notes ID that is outputting text data, or an Audio ID that is outputting captured audio as converted speech-to-text) and the system is able to connect any of these, and other devices with a similar media type, including devices yet to be defined, to the Mail AD in a common way.

During the arming phase of operation, the Grid Pane 720 remains active, displaying alternative workflows (other ASIs 430). If the user selects one of these ASIs 430 after some inputs have been entered, it is desirable not to clear fields, but to transfer the entered data into the new input fields. Therefore when a different ASI 430 is selected, the types of the new IDs is compared with the types of the IDs where inputs have been entered and where the types can be matched, input data is transferred to the new IDs. Matching can of course include loose type matching where one input can be converted and used as another input, e.g. converting a basic text input to a rich text input. Where multiple matches of the same type are found, input data from the highest priority of the previous ID inputs may be transferred to the highest priority of the new ID inputs. Of course, in other embodiments all previously entered data may simply be cleared. A further possibility is that the currently displayed input, i.e. the one that currently has the user's focus or attention is given the highest priority in any newly selected ASI 430, regardless of its internally defined priority.

An example of user arming and triggering is shown in FIG. 8.

In Step 1 of FIG. 8, the software displays the content of the current Action Stack 450 and allows the user to navigate to a new Action Stack 450 if desired. In Step 2, the user has selected a desired Action Stack Item (ASI) 430, in this case the "MULTI-INPUT→MAIL" ASI (shown highlighted in Step 2 to indicate that it has been selected) and the ASI is armed by providing the required inputs. The MULTI-INPUT→MAIL ASI is an IAC with four IAPs as follows:

| ID #instance (IDoMI) | AD #instance (ADiMI) |
| --- | --- |
| Text ID #1 (interface: text out) | --> Mail AD #1 (interface: subject text in) |
| Text ID #2 (interface: text out) | --> Mail AD #1 (interface: body text in) |
| Audio ID #1 (interface: audio out) | --> Mail AD #1 (interface: attachment in) |

-continued

| ID #instance (IDoMI) | AD #instance (ADiMI) |
| --- | --- |
| Image ID #1 (interface: image out) | --> Mail AD #1 (interface: attachment in) |

Step 2 is divided into four steps 2*a*, 2*b*, 2*c* and 2*d* for filling in each of the four required inputs.

In step 2*a* the Text/Mail Subject Text IAP is to be armed. In the Utility Pane 710, the first of these IAPs is shown and is identified by the identifier 801 in the upper left ("Text Device") which indicates the Input Device type and the identifier 802 in the upper right ("Mail Subject") which identifies the Media Interface of the Action Device.

At the left of the Utility Pane 710 are two buttons, one 803 labelled with an arrow which triggers the ASI when selected, and one labelled "Back" 804 which either cancels the current action and allows selection of a different ASI or if no action is currently active replaces the ASIs 430 on screen with those from the preceding Action Stack 450. Additionally, pressing (or otherwise selecting) an ASI that has been armed can also trigger the ASI. Also, a different ASI can be selected directly without use of the back button 804 should that ASI be accessible on screen (e.g. if the GP has not obscured it in some way by a part or whole of an active ID, such as an on screen keyboard for a TEXT ID).

The remainder of the Utility Pane is used for text entry by the user. The upper screenshot in Step 2*a* shows the display before text entry. The lower screenshot in Step 2*a* shows some text entered in the field.

From Step 2*a*, the user may perform a swipe action in the Utility Pane 710 to cycle to the next IAP. This is indicated by the circular arrow symbols between the upper screenshots in FIG. 8. Note that if a priority attribute has been assigned to the IAPs, swiping to the left (in this embodiment) will cycle to the IAP of next highest priority (having commenced with the highest priority IAP when the ASI was selected for arming). Note that swiping in the opposite direction cycles through the IAPs in the reverse priority order.

Performing a swipe to the left from Step 2*a* proceeds to Step 2*b* where the indicators 801 and 802 indicate "Text Device" and "Mail Body Text" respectively, thus identifying the IAP being armed. Again, the upper screenshot shows the User Interface before text entry and the lower screenshot shows the UI after some text has been entered.

Performing a swipe to the left from Step 2*b* proceeds to Step 2*c* where the indicator 801 indicates "Audio Device" and the indicator 802 indicates "Mail Audio Attachment". It will be appreciated that the names and display criteria for indicators 801 and 802 can be customized in a straight forward manner. In the upper screenshot of Step 2*c* the UP 710 presents three control buttons to the user for generating an Audio Input. These are Record button 810, Review button 811 and Delete button 812. The Record button 810 initiates recording from the smart device's microphone. The Review button 811 allows the user to replay the recorded audio to determine if it needs re-recording. The Delete button 812 allows the user to delete the current recording and start again. In the lower screenshot of Step 2*b*, the Record button 810 has been selected and audio recording is in progress. It can be seen that the Record button 810 has been replaced with a Stop button 813. It will be appreciated that the control buttons may take many forms and can be easily customized. For example, when the Review button 811 is selected, the user may be presented with a play/pause button, fast forward and fast reverse buttons, and/or a slider to select the time position within the recording. The Delete button 812 may prompt for a Yes/No confirmation before deleting the recording.

Performing a swipe to the left from Step 2c proceeds to Step 2d where the indicator 801 indicates "Image Device". Indicator 802 indicates "Mail Image Attachment". In the upper screenshot of Step 2c the UP presents three option buttons to the user for selecting an Image Input. These are Camera button 820, a Library button 821 and a Clear button 822. The Camera button 820 uses the camera API of the smart device to allow the user to acquire a new image as input to the fourth IAP. Alternatively, the Library button 821 allows the user to select an image that has already been acquired from the smart device's image library. The Clear button 822 cancels any image that has been taken or selected. As shown in the lower screenshot of Step 2d, once an image has been acquired or selected, a thumbnail preview is displayed next to buttons 820, 821 and 822.

After all the required data has been entered in Steps 2a to 2d (it will be appreciated that some fields may be left blank if not required, e.g. an image may not be required), the arming of the ASI is complete and the operation proceeds to Step 3. This may be initiated by the user selecting button 803 or by the user selecting the ASI button 805 again. This is the triggering step and initiates processing of the IAC. All inputs acquired in steps 2a to 2d are supplied to the relevant inputs of the Mail Device and the Mail Device is activated to process its inputs. At this point the Mail Device produces a draft email with the subject containing the entered subject text and the body containing the entered body text and the two attachments—one audio and one image (not visible in FIG. 8). The Mail Device presents the draft email in full screen modal overlay view to enter further required data (e.g. destination address), and to review and confirm sending. It will be appreciated that the destination address (and any other to, cc or bcc addresses) could be entered as an ID input as well, but for illustration in this embodiment they are required as extra information after the triggering step has been initiated. After the Mail Device has completed sending the mail, the UI returns to showing the Utility Pane and the Grid Pane.

Another way of operating the software is to allow a user to enter data, e.g. text data immediately without having to select a workflow, i.e. navigating to and selecting an ASI button. This may be preferred in some cases as it allows the user to get content down fast without interruptions. Once content has been entered, the software can auto-arm all ASIs that can make use of that input, e.g. all ASIs that require a text input. The user can then select from the available ASIs simply by selecting the appropriate button. If only a single input is required then the ASI can proceed directly to execution, or if further inputs are required then the ASI can proceed to prompt for the further inputs before requiring a further triggering action.

The system may also allow ASIs to be triggered before any data has been entered. For example, triggering a Wikipedia device with no search text may default to opening the Wikipedia home page displaying current stories of interest, etc. Triggering a Mail device with no inputs entered will lead to the Mail device prompting for all inputs. This still represents a shortcut for the user compared with traditional methods of operation as it requires a single trigger compared with in the first case navigating to and launching a web browser app and selecting a bookmark or entering the required URL and in the second case navigating to and launching a mail app and locating and selecting the compose mail option.

The above mode of operation could be available for just text entry, but it could also be made available for all types of input by allowing the user to cycle through all available input devices, filling in data according to requirements. An algorithm can then be used to identify and present to the user the ASIs which can make best use of the entered data, e.g. prioritizing those which can make use of all completed data fields, but perhaps also presenting some which can make use of a sub-set of the entered data fields.

In such embodiments, where multiple instances of a single data type are used by an ASI, the system would pass the entered data to the ID instance with the highest priority, e.g. in the case of a Mail ASI, the text field may be prioritised as a body text field rather than a subject text field.

Another possible mode of operation is similar to the Common ID mode described above, but instead of presenting ASIs which share an ID, the system presents ASIs which share an AD. For example, the system may present to the user all ASIs which invoke a Mail AD. The Inputs would need to be gathered in a similar way to the main freeform entry mode described above and in relation to FIG. 8. This Common AD mode could be useful in a context-sensitive system, e.g. one in which the user's current context is used to determine what type of workflow is most likely required. As an example, the system may determine, based on location and/or velocity, that the user is travelling by public transport, e.g. by train. This may be used as an indication that the user is likely to want to send emails, thus the system can present all ASIs which invoke a Mail Device.

The system may use machine learning algorithms to associate certain types of activity with certain contexts and can thus learn to present the most relevant ASIs to the user according to context, thus speeding up the workflow process. Analysis of the context may include consideration of time of day, day of week, calendar entries as well as ambient context such as location, speed, orientation, noise levels, noise types, etc. Prioritization of IDs may also be learned based on such context analysis, e.g. learning which data fields are normally entered first for a particular task, or taking into account the time of day or relationships to other events when a particular task is regularly undertaken. To facilitate the learning process, context information is gathered at every step of the process, including (but not limited to) at program start up, at AS selection, at ASI initiation, data entry (arming) and triggering.

One of the main differences between IACs and IASs (both of which can be encompassed within an ASI, is that IACs group together a number of IAPs that define a particular task or work element. A standalone IAC can provide parallel loaded IDs and parallel executed ADs. The IAPs within an IAC can be selected and grouped for optimal exploitation of this behaviour. IASs on the other hand provide workflows of standalone IACs, i.e. workflows of compound parallel loaded/executed IACs. The IAC outputs are able to affect (or provide) inputs (and thereby the outputs) of later IACs in the sequence. Thus IASs reflect a user's particular work pattern rather than being inherently focused on a specific system task or action.

In the case of sequenced IACs (IASs), where the steps have some defined order and/or dependencies, upon selection of the ASI which contains the IAS, the first IAC in the IAS is initiated. Upon execution of each constituent IAC (i.e. following completion of the trigger activity for each IAC), the next IAC in the sequence is loaded.

In some embodiments, an IAS may be executed in the above manner via a first selection action, while a second selection action leads to opening of the IAS to display a list of the constituent IACs, thus allowing execution of the components in a different order (if such is possible, given the dependencies). The first and second selection actions may be for example a short press and a long press on a touchscreen, or a left click and a right click of a pointer device such as a computer mouse.

As well as pre-configured IAPs, IACs and IASs, one of the main advantages of the system is that it is highly user configurable. Not only can the user create new IACs and IASs from existing IAPs, but the user can create new IAPs by selecting and matching the various available Input Devices with the various available Action Devices.

Figures 1, 9:
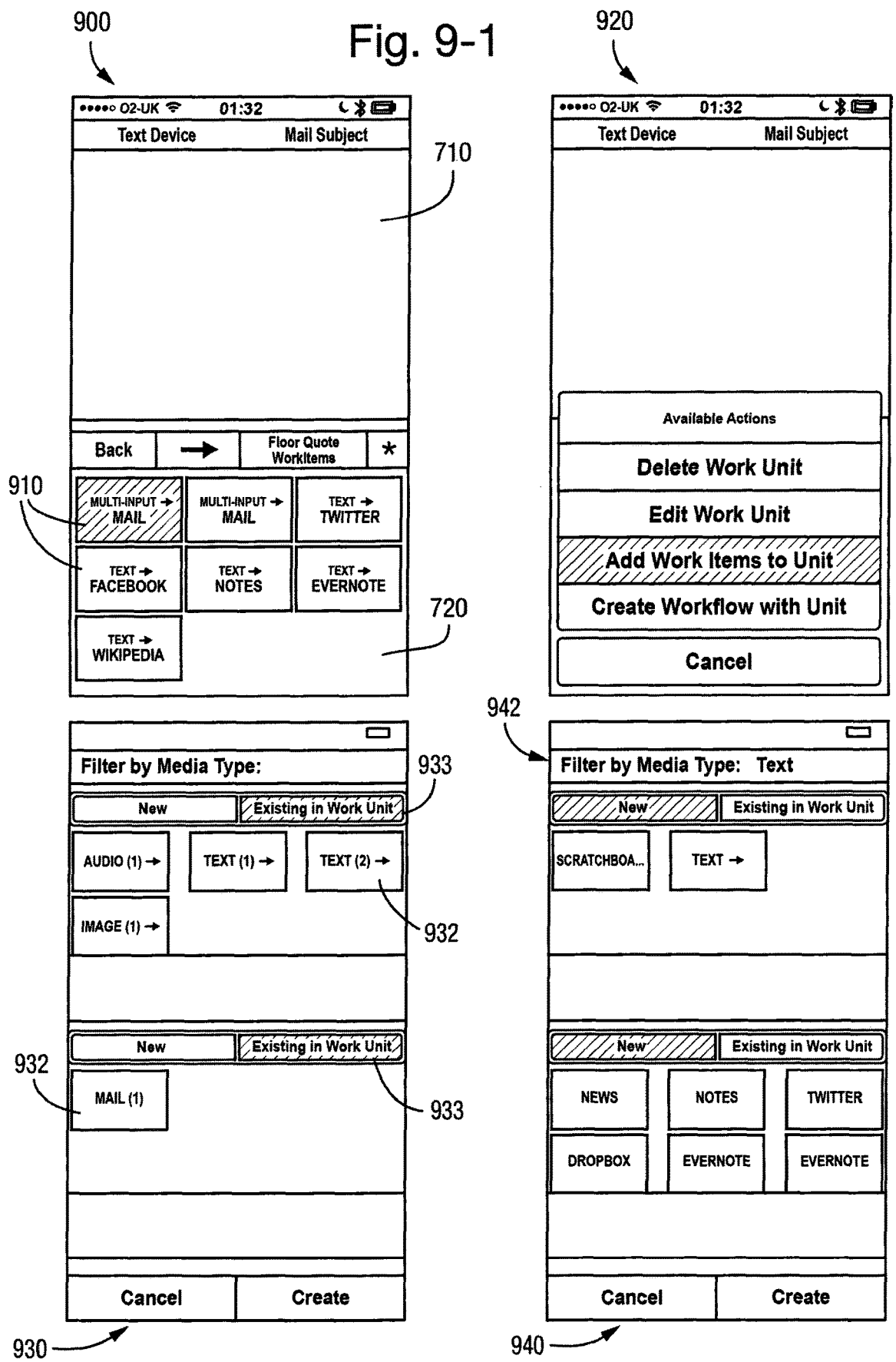
FIG. 9 shows screenshots illustrating the creation/editing of a workflow.

The process of editing an IAC will now be described with reference to FIG. 9. In FIG. 9, the first screenshot 900 shows the contents of an Action Stack 450 entitled "Floor Quote Workitems". There are seven IACs 300 within this AS 450, displayed as seven buttons 910 in the Grid Pane 720. The upper left button 910 (named "MULTI-INPUT→MAIL") is shown highlighted to indicate that it is being selected. In this case, it is being selected by a long-press to bring up a list of management options.

The second screenshot 920 shows the list of management options available. Note that in the embodiment shown here, the term "Work Unit" is used to indicate an IAC and the term "Work Item" is used to indicate an IAP. These terms are more user friendly for the end user of the software. The four options displayed are "Delete Work Unit" which allows the whole "MULTI-INPUT→MAIL" IAC to be removed from the "Floor Quote Workitems" AS. The "Edit Work Unit" option allows the properties such as the display name of the IAC to be altered or the priorities of the IAPs within the IAC to be altered. The "Add Work Items to Unit" option allows further IAPs to be added to the IAC and the "Create Workflow with Unit" option allows the IAC to be used as the starting point for creating a sequenced workflow, i.e. an IAS.

As an illustration, if the "Add Work Items to Unit" option is selected from screenshot 920, the third screenshot 930 is displayed.

In the third screenshot 930, the upper grid shows Input Devices and the lower grid shows Action Devices displayed as buttons 932. The Devices shown in this screenshot are those that are already in use within the IAC. This is indicated by the "Existing in Work Unit" button 933 above each grid display. This button 933 can be toggled to display new Devices that are available for adding to the IAC. This allows the user to re-use Devices that are already in use in the IAC (e.g. to connect one ID to multiple ADs or vice versa), or to add completely new Devices, or new instances of a Device to the IAC. In the third screenshot 930, the Devices currently in the IAC are shown with an instance number in brackets after their name, e.g. there are two instances of the TEXT device labelled "TEXT (1)" and "TEXT (2)" in the ID grid. The AD grid contains only a single MAIL device.

In the fourth screenshot 940, both the buttons 933 have been toggled from "Existing in Work Unit" to "New". Therefore both the upper and lower grid panes now show new devices that can be added to the IAC. Note that a further constraint has been applied in the fourth screenshot to limit the number of devices for selection (thus helping the user find what they want fast); only devices with Text Media Interfaces are shown. This is shown at the top of the screen by the filter box 942 which shows "Filter by Media Type: Text". This could of course be changed to filter by other Media Types such as Audio, Image, Rich Text, etc. The filter applies to both the displayed IDs and displayed ADs.

In this example, the user wishes to add a TEXT→TWITTER IAP, using a new TEXT input rather than re-using the existing ones. In the fifth screenshot 950, the "TEXT→" Device has been selected (and is shown highlighted) in the upper (ID) grid. The TEXT Device's possible interfaces are displayed below it. There is only one output interface for the TEXT Device, namely "interface-TEXT_TEXT_OUT-1".

This has been selected (and is shown highlighted). Similarly, in the lower (AD) grid, the user has selected the "TWITTER" Device (shown highlighted). Note that the grid pane is scrollable, so other devices which are not shown can be scrolled to and selected. The TWITTER" Device has more than one available input (Text and Image), but the Text filter 942 is still being applied, so only the Text input interface is displayed. This interface ("interface-TWITTER-_MESSAGETEXT_IN-1") has been selected and is shown highlighted. This combination that has now been selected (An ID and its output interface and an AD and a matching input interface) defines an IAP. The user finally presses the create button 952 to add this new IAP to the "MULTI-INPUT→MAIL" IAC. The process moves on to the sixth screenshot 960.

As the IAC functionality has been changed by adding a new IAP, the user is presented with an option to change the name of the IAC in the sixth screenshot 960. The newly entered name is shown in the seventh screenshot 970 and when the "Confirm" button 972 is pressed the eighth screenshot 980 shows the return to the AS view with the newly edited "MAIL THEN TWEET" IAC shown.

A person of ordinary skill in the art will appreciate that the processes for editing IAPs, IACs and IASs are similar to the above description in this embodiment and that in other embodiments alternative user interfaces may be used to achieve the same effects.

However, it can be seen from the above process description that the architecture provided by this embodiment makes it very quick and easy for a user to create new functionality and new work flows on a smart device without the need for complex programming skills. The system architecture allows a lot of the system's functionality to be made available to the user and provides the user with great flexibility in the way that functionality is connected to further processing units.

An example system is schematically illustrated in FIG. 10. FIG. 10 shows a smartphone 1000 with a touchscreen 1001 for displaying results to and receiving touch inputs from the user, a camera 1002, a microphone 1003, accelerometers 1004, magnetic sensors 1005, a compass 1006, location processor 1007, antenna 1008, microprocessor 1009, memory 1010 containing a database 1011 and other buttons 1012 (e.g. on/off button, volume buttons, lock button).

The invention claimed is:

1. A computer-implemented method of creating and programming a workflow for a smart device, comprising:
   presenting, on a graphical user interface (GUI), a plurality of input devices, each selectable and representing a media data input mechanism of said smart device;
   receiving, by way of the GUI, a selection of one or more of said input devices, wherein each of the input devices has one or more outputs;
   presenting, on the GUI, a plurality of action devices, each selectable and representing a programmed action that can be taken by the smart device;
   receiving, by way of the GUI, a selection of one or more of the action devices, wherein each of the action devices has one or more action device inputs;
   forming and storing, in a data structure of a database, two input-action associations between each of two selected input devices and an input of a first selected action device, including: (i) a first input-action association between an output of a first selected input device and the input of the first selected action device, and (ii) a second input-action association between an output of a second selected input device and the input of the first selected action device;

forming a first plurality of input-action combinations, including a first input-action combination and a second input-action combination, wherein each input-action combination is formed by associating a plurality of input-action associations together, wherein at least one of the input-action combinations includes an association between the first input-action association and the second input-action association, and wherein each input device of the first plurality of input-action combinations is a user-input device configured to prompt a user for an input and to acquire its input from the user;

forming a sequence of the first plurality of input-action combinations to form an input-action sequence;

storing the input-action combinations and the input-action sequence as database entries in the database;

executing the input-action sequence on the smart device, wherein the executing comprises:

presenting, on a GUI of the smart device, a user-selectable GUI element for each input-action combination of the input-action sequence according to an order defined by the sequence, where each user-selectable GUI element visually identifies an input device and an action device of each input-action combination;

in response to selection of the user-selectable GUI element for each input-action combination of the first plurality of input-action combinations, prompting the user for input defining media data for each input-action association of the input-action combination; and triggering, in response to a user interaction, the input-action sequence, wherein the triggering comprises:

for each input action combination, transferring loaded data from its associated input devices to its associated action devices, including activating the first selected action device to process both (i) an input from the output of the first selected input device, and (ii) an input from the output of the second selected input device, said transferring steps being executed in the order defined by the sequence, wherein the transferring step of the first input-action combination takes place before the transferring step of the second input-action combination.

2. The computer-implemented method as claimed in claim 1, wherein the user selects the output of the first selected input device and the input of the first selected action device to form the first input-action association.

3. The computer-implemented method as claimed in claim 1, wherein the output of the first selected input device, the output of the second selected input device, and the input of the first selected action device have associated therewith a media type which identifies a type of content that will be produced or delivered respectively.

4. The computer-implemented method as claimed in claim 3, further comprising:

automatically identifying that the output of the first selected input device and the input of the first selected action device can be paired by matching their respective media types; and automatically identifying that the output of the second selected input device and the input of the first selected action device can be paired by matching their respective media types.

5. The computer-implemented method as claimed in claim 1, further comprising:

allocating an input device priority attribute to one or more input-action associations within the first input-action combination, said input device priority attribute identifying a preferred order in which input devices should be presented for input data collection.

6. The computer-implemented method as claimed in claim 1, further comprising:

allocating an action device priority attribute to one or more input-action associations within the first input-action combination, said action device priority attribute identifying a preferred order in which action devices should be processed.

7. The computer-implemented method as claimed in claim 1, wherein the first input-action combination has an input device instance attribute associated with each input-action association within the first input-action combination, said input device instance attribute identifying an instance of the input device to which the input-action association relates.

8. The computer-implemented method as claimed in claim 1, wherein the first input-action combination has an action device instance attribute associated with each input-action association within the first input-action combination, said action device instance attribute identifying an instance of the action device to which the input-action association relates.

9. The computer-implemented method as claimed in claim 1, wherein the computer-implemented method further comprises:

allocating a dependency attribute to at least one input-action association which identifies another input-action association on which it depends.

10. The computer-implemented method as claimed in claim 1, further comprising:

allocating a sequence position attribute to each input-action combination in the input-action sequence identifying its position within the sequence.

11. The computer-implemented method as claimed in claim 10, wherein the sequence position attribute comprises a relationship to one or more of the next or previous input-action pair combination in the input-action sequence.

12. The computer-implemented method as claimed in claim 1, wherein each input-action association in the input-action sequence has a sequenced input device instance attribute that identifies an instance of the input device to which the input-action association relates.

13. The computer-implemented method as claimed in claim 1, wherein each input-action association in an input-action sequence has a sequenced action device instance attribute that identifies an instance of the action device to which the input-action association relates.

14. The computer-implemented method as claimed in claim 1, wherein at least one input device is selected from among: a text capture device, an image capture device, a video capture device, an audio capture device, a touch capture device, a speech capture device a location sensing device, an orientation sensing device, an acceleration sensing device, a monitoring device, a notification driven device, an event driven device, a time based device and a connectivity sensing device.

15. The computer-implemented method as claimed in claim 1, wherein at least one action device is selected from among: an email sending device, a short messaging device, a media messaging device, a social networking device, a blogging device, a notes device, a local storage device, a cloud storage device, an information reference device, a telecommunication device, a news reading device, a book reading device, a database device, a web browsing device, a web application device, an internet client application device, a mobile app launching device, a text processing device, an audio processing device, an image processing device, a vector drawing processing device, a numeric processing device, a touch processing device, a video processing device, a navigation device, a healthcare device, a payment device, a retail commerce device, a general processing device, a games device, a monitoring device, a notification device, an event generation device and a media streaming device.

16. A method of operating a workflow on a smart device, wherein the workflow comprises at least two input-action associations between each of two selected input devices and an input of a first selected action device, including: (i) a first input-action association between an output of a first input device and an input of a first action device, and (ii) a second input-action association between an output of a second input device and the input of the first action device, wherein the workflow comprises an input-action sequence, comprising a first plurality of input-action combinations, including a first input-action combination and a second input-action combination, wherein each input-action combination is formed by associating a plurality of input-action associations together, wherein at least one of the input-action combinations includes an association between the first input-action association and the second input-action association, wherein each input device of the first plurality of input-action combinations is a user-input device configured to prompt a user for an input and to acquire its input from the user, wherein the input-action combinations and the input-action sequence are stored as database entries in a database, and wherein the two selected input devices and the first selected action device are selected from a graphical user interface (GUI) presentation of a plurality of selectable input devices and a plurality of selectable action devices, the method comprising:

creating instances of the first input device and the second input device;
loading data into each input device instance;
creating an instance of the first action device;
executing the input-action sequence on the smart device, wherein the executing comprises:
presenting, on a GUI of the smart device, a user-selectable GUI element for each input-action combination of the input-action sequence according to an order defined by the sequence, where each user-selectable GUI element visually identifies an input device and an action device of each input-action combination;
in response to selection of the user-selectable GUI element for each input-action combination of the first plurality of input-action combinations, prompting the user for input defining media data for each input-action association of the input-action combination; and
triggering, in response to a user interaction, the input-action sequence, wherein the triggering comprises:
for each input-action combination of the input-action sequence, causing all loaded data to be transferred from the input devices to the action devices for all input action associations within the input-action combination, including activating the first action device to process both (i) an input from the output of the first input device, and (ii) an input from the output of the second input device; and
said transferring steps being executed in the order defined by the input-action sequence, wherein the transferring step of the first input-action combination takes place before the transferring step of the second input-action combination.

17. The method as claimed in claim 16, wherein each of the first plurality of input-action combinations comprises at least one input-action association, wherein each of the first plurality of input-action combinations have a sequence attribute which identifies a sequence in which the input-action combinations are to be executed, and wherein each of the first plurality of input-action combinations undergoes a step of transferring loaded data from its associated input device to its associated action device, said transferring steps being executed in the sequence defined by the sequence attributes.

18. The method as claimed in claim 17, wherein at least one input-action combination in the sequence includes a decision device which, when executed, is capable of altering progression of the sequence.

19. The method as claimed in claim 17, wherein at least one input-action combination in the sequence includes a decision device which, when executed, is capable of transforming one or more of its inputs to produce its outputs or generating new outputs based on its inputs, internal logic and configurable decision criteria.

20. The method as claimed in claim 16, wherein transferring data from one or more input devices to one or more action devices comprises transferring the data from the input devices to an intermediate data structure and then transferring the data from the intermediate data structure to the action devices.

21. The method as claimed in claim 20, wherein the intermediate data structure comprises elements based on a media type of input interfaces of the action devices.

22. A software product comprising instructions, stored on a non-transitory computer-readable medium, which when executed by a computer cause the computer to:
present, on a graphical user interface (GUI) of the computer, a plurality of input devices, each selectable and representing a programmed media input mechanism of said computer;
receive, by way of the GUI, a selection of one or more of said input devices, wherein each of the input devices has one or more input device outputs;
present, on the GUI, a plurality of action devices, each selectable and representing a programmed action that can be taken by the computer;
receive, by way of the GUI, a selection of one or more of said action devices, wherein each of the action devices has one or more action device inputs;
form and store, in a data structure of a database, two input-action associations between each of two selected input devices and an input of a first selected action device, including: (i) a first input-action association between an output of a first selected input device and the input of the first selected action device, and (ii) a second input-action association between an output of a second selected input device and the input of the first selected action device;
form a first plurality of input-action combinations, including a first input-action combination and a second input-action combination, wherein each input-action combination is formed by associating a plurality of input-action associations together, wherein at least one of the input-action combinations includes an association between the first input-action association and the second input-action association, wherein each input device of the first plurality of input-action combinations is a user-input device configured to prompt a user for an input and to acquire its input from the user;

form a sequence of the first plurality of input-action combinations to form an input-action sequence;

store the input-action combinations and the input-action sequence as database entries in the database;

execute the input-action sequence on a smart device, wherein the executing comprises:

presenting, on a GUI of the smart device, a user-selectable GUI element for each input-action combination of the input-action sequence according to an order defined by the sequence, where each user-selectable GUI element visually identifies an input device and an action device of each input-action combination;

in response to selection of the user-selectable GUI element for each input-action combination of the first plurality of input-action combinations, prompting the user for input defining media data for each input-action association of the input-action combination; and trigger, in response to a user interaction, the input-action sequence, wherein the triggering comprises:

for each input action combination, transferring loaded data from its associated input devices to its associated action devices, including activating the first selected action device to process both (i) an input from the output of the first selected input device, and (ii) an input from the output of the second selected input device, said transferring steps being executed in the order defined by the sequence, wherein the transferring step of the first input-action combination takes place before the transferring step of the second input-action combination.

23. A computer-implemented method comprising:

presenting, on a graphical user interface (GUI), a plurality of input devices, each selectable and representing a media data input mechanism;

receiving, by way of the GUI, a selection of one or more of said input devices, wherein each of the input devices has one or more input device outputs;

presenting, on the GUI, a plurality of action devices, each selectable and representing a programmed action that can be taken;

receiving, by way of the GUI, a selection of one or more of said action devices, wherein each of the action devices has one or more action device inputs;

forming and storing, in a data structure of a database, two input-action associations between each of two selected input devices and an input of a first selected action device, including: (i) a first input-action association between an output of a first selected input device and the input of the first selected action device, and (ii) a second input-action association between an output of a second selected input device and the input of the first selected action device;

forming a first plurality of input-action combinations, including a first input-action combination and a second input-action combination, wherein each input-action combination is formed by associating a plurality of input-action associations together, wherein at least one of the input-action combinations includes an association between the first input-action association and the second input-action association, and wherein each input device of the first plurality of input-action combinations is a user-input device configured to prompt a user for an input and to acquire its input from the user;

forming a sequence of the first plurality of input-action combinations to form an input-action sequence;

storing the input-action combinations and the input-action sequence as database entries in the database;

executing the input-action sequence on a smart device, wherein the executing comprises:

presenting, on a GUI of the smart device, a user-selectable GUI element for each input-action combination of the input-action sequence according to an order defined by the sequence, where each user-selectable GUI element visually identifies an input device and an action device of each input-action combination;

in response to selection of the user-selectable GUI element for each input-action combination of the first plurality of input-action combinations, prompting the user for input defining media data for each input-action association of the input-action combination; and triggering, in response to a user interaction, the input-action sequence, wherein the triggering comprises:

for each input action combination, transferring loaded data from its associated input devices to its associated action devices, including activating the first selected action device to process both (i) an input from the output of the first selected input device, and (ii) an input from the output of the second selected input device, said transferring steps being executed in an order defined by the sequence, wherein the transferring step of the first input-action combination takes place before the transferring step of the second input-action combination.

24. A computer-implemented method of providing a software product to a remote location by way of transmitting data to a computer at that remote location, the data comprising instructions which when executed by the computer cause the computer to:

present, on a graphical user interface (GUI) of the computer of the computer, a plurality of input devices, each selectable and representing a media data input mechanism of said computer;

receive, by way of the GUI, a selection of one or more of said input devices, wherein each of the input devices has one or more input device outputs;

present, on the GUI, a plurality of action devices, each selectable and representing a programmed action that can be taken by the computer;

receive, by way of the GUI, a selection of one or more of said action devices, wherein each of the action devices has one or more inputs;

form and store, in a data structure of a database, two input-action associations between each of two selected input devices and an input of a first selected action device, including: (i) a first input-action association between an output of a first selected input device and the input of the first selected action device, and (ii) a second input-action association between an output of a second selected input device and the input of the first selected action device;

form a first plurality of input-action combinations, including a first input-action combination and a second input-action combination, wherein each input-action combination is formed by associating a plurality of input-action associations together, wherein at least one of the input-action combinations includes an association between the first input-action association and the second input-action association, and wherein each input device of the first plurality of input-action combinations is a user-input device configured to prompt a user for an input and to acquire its input from the user;

form a sequence of the first plurality of input-action combinations to form an input-action sequence;

store the input-action combinations and the input-action sequence as database entries in the database;

execute the input-action sequence on a smart device, wherein the executing comprises:

presenting, on a GUI of the smart device, a user-selectable GUI element for each input-action combination of the input-action sequence according to an order defined by the sequence, where each user-selectable GUI element visually identifies an input device and an action device of each input-action combination;

in response to selection of the user-selectable GUI element for each input-action combination of the first plurality of input-action combinations, prompting the user for input defining media data for each input-action association of the input-action combination; and trigger, in response to a user interaction, the input-action sequence, wherein the triggering comprises:

for each input action combination, transferring loaded data from its associated input devices to its associated action devices, including activating the first selected action device to process both (i) an input from the output of the first selected input device, and (ii) an input from the output of the second selected input device, said transferring steps being executed in the order defined by the sequence, wherein the transferring step of the first input-action combination takes place before the transferring step of the second input-action combination.

\* \* \* \* \*